(12) United States Patent
Moreton et al.

(10) Patent No.: US 10,102,668 B2
(45) Date of Patent: Oct. 16, 2018

(54) SYSTEM, METHOD, AND COMPUTER PROGRAM PRODUCT FOR RENDERING AT VARIABLE SAMPLING RATES USING PROJECTIVE GEOMETRIC DISTORTION

(71) Applicant: NVIDIA Corporation, Santa Clara, CA (US)

(72) Inventors: Henry Packard Moreton, Woodside, CA (US); Jonah M. Alben, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 105 days.

(21) Appl. No.: 15/147,872

(22) Filed: May 5, 2016

(65) Prior Publication Data

US 2017/0323475 A1 Nov. 9, 2017

(51) Int. Cl.
*G06T 15/20* (2011.01)
*G06T 15/80* (2011.01)
*G06T 15/30* (2011.01)

(52) U.S. Cl.
CPC .............. *G06T 15/80* (2013.01); *G06T 15/20* (2013.01); *G06T 15/30* (2013.01); *G06T 2215/06* (2013.01)

(58) Field of Classification Search
None
See application file for complete search history.

(56) References Cited

U.S. PATENT DOCUMENTS

| 6,249,289 B1 * | 6/2001 | Arnaud | G06T 15/005 345/419 |
| 6,285,779 B1 * | 9/2001 | Lapidous | G06T 15/405 345/422 |
| 7,420,557 B1 * | 9/2008 | Moreton | G06T 15/005 345/427 |
| 2003/0076331 A1 * | 4/2003 | Deering | G06T 15/80 345/581 |
| 2003/0184778 A1 * | 10/2003 | Chiba | H04N 1/3876 358/1.9 |
| 2015/0178884 A1 * | 6/2015 | Scholl | G06T 3/0018 348/36 |
| 2015/0179150 A1 * | 6/2015 | Andrysco | G09G 5/391 345/156 |
| 2015/0287158 A1 * | 10/2015 | Cerny | G06F 3/013 345/553 |

* cited by examiner

*Primary Examiner* — Xiao M Wu
*Assistant Examiner* — Steven Z Elbinger
(74) *Attorney, Agent, or Firm* — Zilka-Kotab, P.C.

(57) ABSTRACT

A system, method, and computer program product are provided for rendering at variable sampling rates. Vertex coordinates for 3D primitive are received from a shader execution unit, and an arithmetic operation is performed on the vertex coordinates by fixed operation circuitry to produce modified vertex coordinates in homogeneous coordinate space. The modified vertex coordinates are transformed from homogeneous coordinate space into screen-space to produce screen-space vertex coordinates of a transformed 3D primitive and the transformed 3D primitive is rasterized in screen-space using the screen-space vertex coordinates to produce an image for display.

20 Claims, 24 Drawing Sheets

Diamond-Shaped Region
216

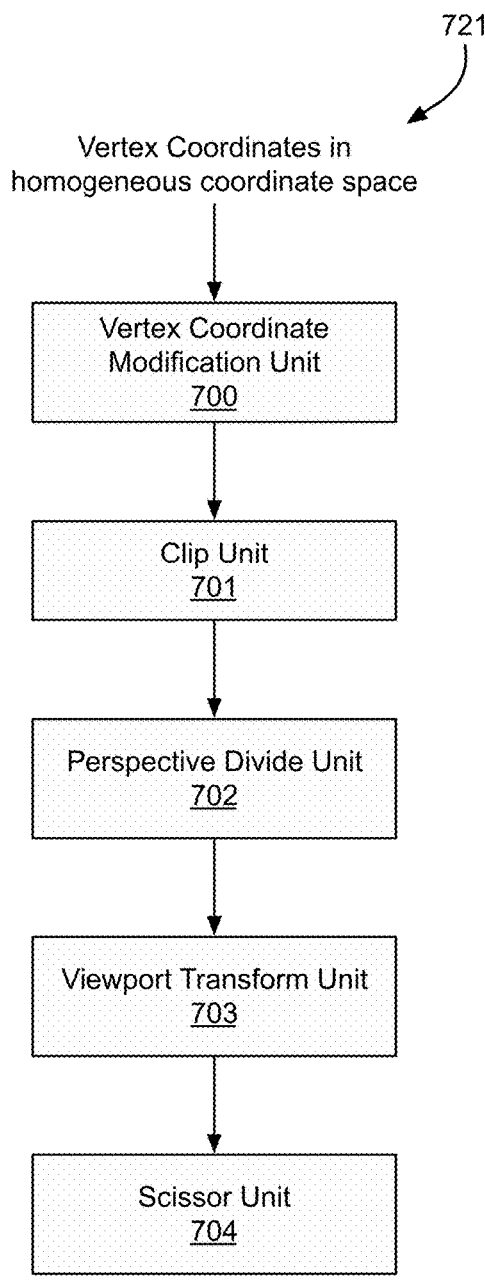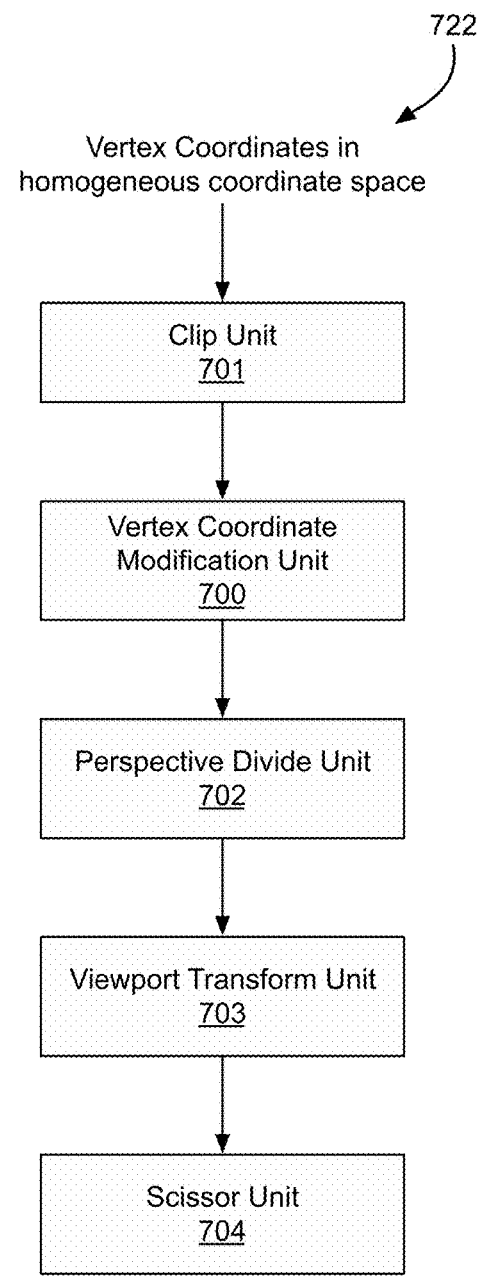
*Fig. 7C*  *Fig. 7D*

SYSTEM, METHOD, AND COMPUTER PROGRAM PRODUCT FOR RENDERING AT VARIABLE SAMPLING RATES USING PROJECTIVE GEOMETRIC DISTORTION

FIELD OF THE INVENTION

The present invention relates to graphics processors, and more particularly to rendering at variable sampling rates.

BACKGROUND

When graphics primitives are rendered the pixels that are covered by each primitive are determined during rasterization. Classical three-dimensional (3D) Z-buffered rendering assumes that a uniform or constant sampling rate (i.e., sampling resolution) is desired across the display screen. However, some applications may benefit from the ability to sample non-uniformly. In particular, virtual reality (VR) requires a variable sampling resolution that is matched (inversely) to the optics of the VR display screen. A 3D scene is rendered with a conservative and uniform sampling resolution to produce an image. The image is then resampled to match the variable VR sampling resolution and produce the resampled image for display by the VR display. Rendering the entire scene at a uniform sampling rate and then resampling the image to match the desired sampling rate is wasteful. In particular, many more samples are shaded than are required given the final display screen pixel resolution. Specifically, pixels further from the center of the view are sampled at a lower rate, so that a significant portion of the image rendered at the uniform sampling rate is higher than what is needed to produce the resampled image for display. There is thus a need for addressing these and/or other issues associated with the prior art.

SUMMARY

A system, method, and computer program product are provided for rendering at variable sampling rates. In one embodiment, vertex coordinates for 3D primitive are received from a shader execution unit, and an arithmetic operation is performed on the vertex coordinates by fixed operation circuitry to produce modified vertex coordinates in homogeneous coordinate space. The modified vertex coordinates are transformed from homogeneous coordinate space into screen-space to produce screen-space vertex coordinates of a transformed 3D primitive and the transformed 3D primitive is rasterized in screen-space using the screen-space vertex coordinates to produce an image for display.

In another embodiment, vertex coordinates for a 3D primitive in homogeneous coordinate space are received and a first projective geometric distortion is performed on the vertex coordinates using a first operation to produce modified vertex coordinates in homogeneous coordinate space. A second projective geometric distortion is performed on the vertex coordinates using a second operation to produce second modified vertex coordinates in the homogeneous coordinate space. The modified vertex coordinates are transformed and the second modified vertex coordinates into screen-space to produce screen-space vertex coordinates of a transformed 3D primitive. The transformed 3D primitive is rasterized in screen-space using the screen-space vertex coordinates to produce an image for display.

BRIEF DESCRIPTION OF THE DRAWINGS

FIGS. 7C and 7D illustrate a portion of a graphics processing pipeline including a vertex coordinate modification unit, in accordance with respective embodiments.

DETAILED DESCRIPTION

Being able to render with a non-uniform sampling rate that is a closer match to the requirements of VR display optics, may be roughly twice as efficient as rendering with a conservative and uniform sampling rate to produce an image and then sampling the image to match the VR display optics. A transformation may be applied to the graphics primitives in homogenous coordinate space, which will have the effect of causing the graphics primitives to be non-uniformly sampled from the perspective of the original coordinates of the graphics primitives. As a result, an object that is positioned in the periphery of the view can be sampled more coarsely than an object that is positioned in the center of the view, for example. If the coordinates of vertices in the scene (in homogeneous coordinate space, projective coordinate space, clip-space, or view-space) are modified, the perspective projection mechanism may be used to implement a varied sampling rate using a standard rasterization pipeline. Compared with world space which is three-dimensions (x, y, z), homogeneous space includes a fourth dimension, w. The w dimension often represents a distance from a viewer to an object (or vertex defining a primitive or an object). In one embodiment, the w dimension represents a weight value.

In one embodiment, the vertex coordinates are represented in projective space so that matrix operations (e.g., translation, scale, rotation, etc.) may be applied to perform geometric projections. In one embodiment, each vertex may be represented as homogeneous coordinates (e.g., x, y, z, and w), where the w coordinate associated with each primitive vertex is modified to implement the varied sampling rate. Additionally, the sampling rate may be varied based on a distance from the center of the VR display.

Figure 1:
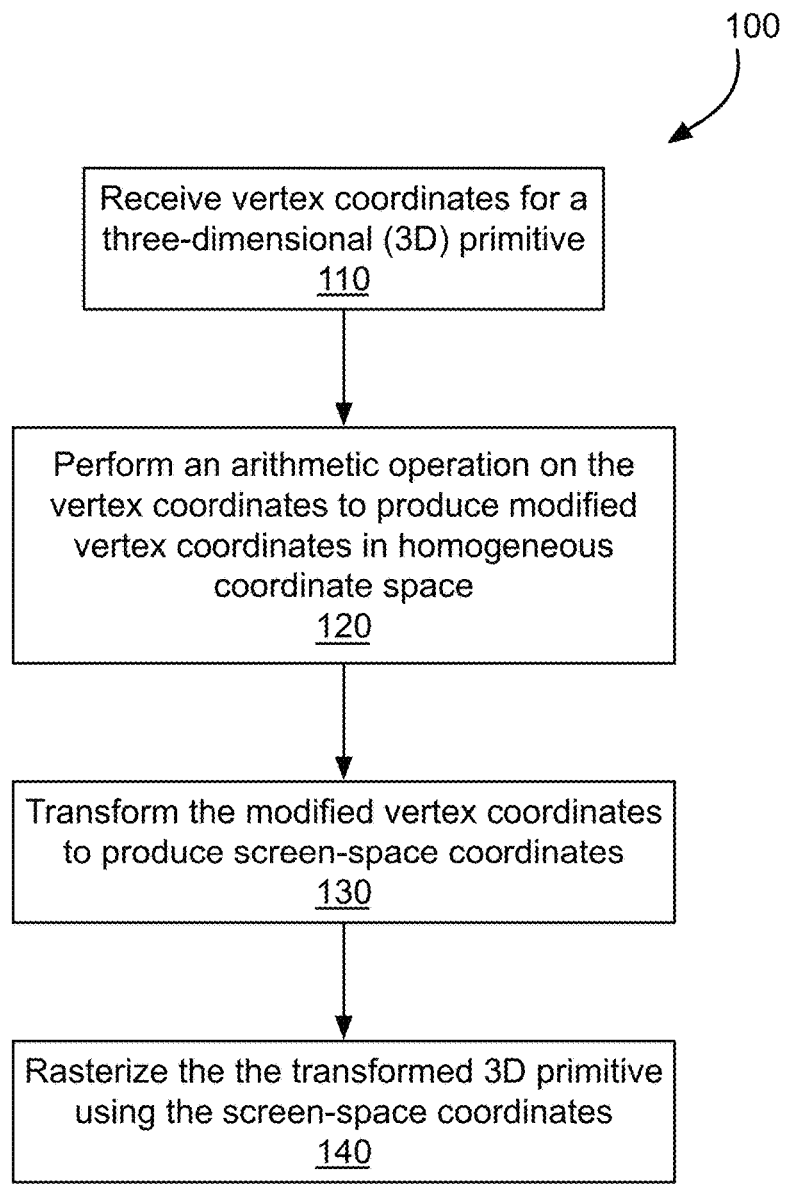
FIG. 1 illustrates a method for rendering at variable sample rates, in accordance with one embodiment.

FIG. 1 illustrates a method 100 for rendering at a variable sampling rate using projective geometric distortion, in accordance with one embodiment. At step 110, vertex coordinates for a 3D primitive are received. In the context of the present description, a primitive refers to any element (e.g. a polygonal element, etc.) that is capable of being utilized to image a polygon (e.g. such as a triangle, a rectangle, etc.), or that is capable of being used to image an object capable of being represented by polygons.

In various embodiments, the 3D primitive may be received by a graphics processor. In the context of the following description, the graphics processor may include any number of graphics processor pipeline units, fixed operation circuits, and programmable shader execution units, as well as associated hardware and software. For example, in one embodiment, the graphics processor may include one or more shader execution units capable of executing shader programs, such as a vertex shader, a tessellation initialization shader, a tessellation shader, and a geometry shader. Moreover, in one embodiment, the vertex shader and the geometry shader may each execute on a programmable shader execution unit. While a shader execution unit may be programmable it is not meant to be limiting to how the shader execution unit is implemented. In one embodiment, the shader execution unit is a combination of programmable circuitry and fixed operation circuitry. In one embodiment, the vertex coordinates that are generated by a vertex shader program are received in homogeneous coordinate space. In one embodiment, at step 110, the vertex coordinates are received from a programmable shader execution unit configured to execute either a vertex shader program or a geometry shader program.

At step 120, an arithmetic operation is performed on the vertex coordinates to produce modified vertex coordinates in homogeneous coordinate space. In one embodiment, the arithmetic operation is performed by fixed operation circuitry. The fixed operation circuitry may be separate from the programmable shader execution unit. In one embodiment, at step 120, the arithmetic operation is first function that defines a matrix operation and/or a projective geometric distortion. In the context of the following description, a projective geometric distortion of a vertex coordinate "v" is a function in the form v'=Ax+By+Cz+Dw+E, where x, y, z and w are vertex coordinates, A, B, C, D and E distortion factors that may be any real number, "v" is one of x, y, z or w, and the new value of the coordinate. Any reduced form of the equation above, for example at least one of A, B, C, D or E being equal to zero, is also understood to be a projective geometric distortion. A projective geometric distortion may also be a function in the form:

$$\begin{bmatrix} x' \\ y' \\ z' \\ w' \end{bmatrix} = \begin{bmatrix} A & B & C & D \\ E & F & G & H \\ I & J & K & L \\ M & N & O & P \end{bmatrix} \cdot \begin{bmatrix} x \\ y \\ z \\ w \end{bmatrix}$$

In one embodiment, a projective geometric distortion is applied to a w coordinate in homogenous coordinate space for each vertex to reduce a size of at least a portion of the primitive in screen-space. In one embodiment, a projective geometric distortion based on a distance to the vertex from the viewer and a position of the vertex relative to a center of a display surface is applied to the vertex coordinates for each vertex. In one embodiment, the projective geometric distortion corresponds to an inverse of the optics of a VR display screen. In one embodiment, the display screen is a head mounted display (HMD) and the projective geometric distortion that is applied at step 120 is intended to approximate the lens distortion of a display screen of the HMD.

At step 130, the modified vertex coordinates are transformed into screen-space to produce screen-space vertex coordinates. In the context of the following description, transforming the vertices from homogeneous coordinate space to screen-space corresponds to transforming the vertices according to a view definition. In one embodiment, the view definition specifies at least a portion of a display screen and the transforming comprises dividing the modified vertex coordinates by the modified w coordinate to produce a transformed 3D primitive (i.e., performing a perspective divide). The transformed 3D primitive is then scaled to match a resolution of the display screen.

At step 140, the transformed 3D primitive is rasterized in screen-space using the screen-space vertex coordinates. In the context of the following description, rasterization determines per-pixel samples that are covered by the primitive in screen-space. The covered samples may then be shaded to produce an image for display.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Modification or manipulation of the vertex coordinates when the projective geometric distortion is applied should be invertible, so that the same or approximately the same image (modulo sampling differences) is produced as when a uniformly sampled rendering is performed followed by resampling. For example, lines should appear as lines, points with a common angle to the eye should retain their relative distance from the eye after transformation, etc. Performing a projective geometric distortion of the w coordinate for each vertex using a linear transform ensures that relative distances from the viewer are maintained for each vertex. Furthermore, performing a projective geometric distortion of the w coordinate also enables existing vertex shaders, a rasterizer, and pixel shaders to be used to produce the warped or distorted images with the addition of fixed operation circuitry to apply a projective geometric distortion to modify the w coordinate. In one embodiment, a driver program is configured to insert instructions into a shader program that is executed by a programmable shader execution unit to apply projective geometric distortion to modify the w coordinate.

To achieve the desired property of variable pixel sampling resolution that is highest in the center of the display screen and falls off in the periphery (in any direction), the display screen may be split into four separate regions. In one embodiment, each region is associated with a different view in homogeneous coordinate space. In one embodiment, a different projective geometric distortion may be applied to modify vertex coordinates differently for each one of the regions so that the sampling rate may vary within each region. The projective geometric distortion may be fixed or may be specified by a shader program. Vertex coordinates generated by a vertex shader may have projective geometric distortions applied according to one or more views to produce the modified vertices.

Figure 2A:
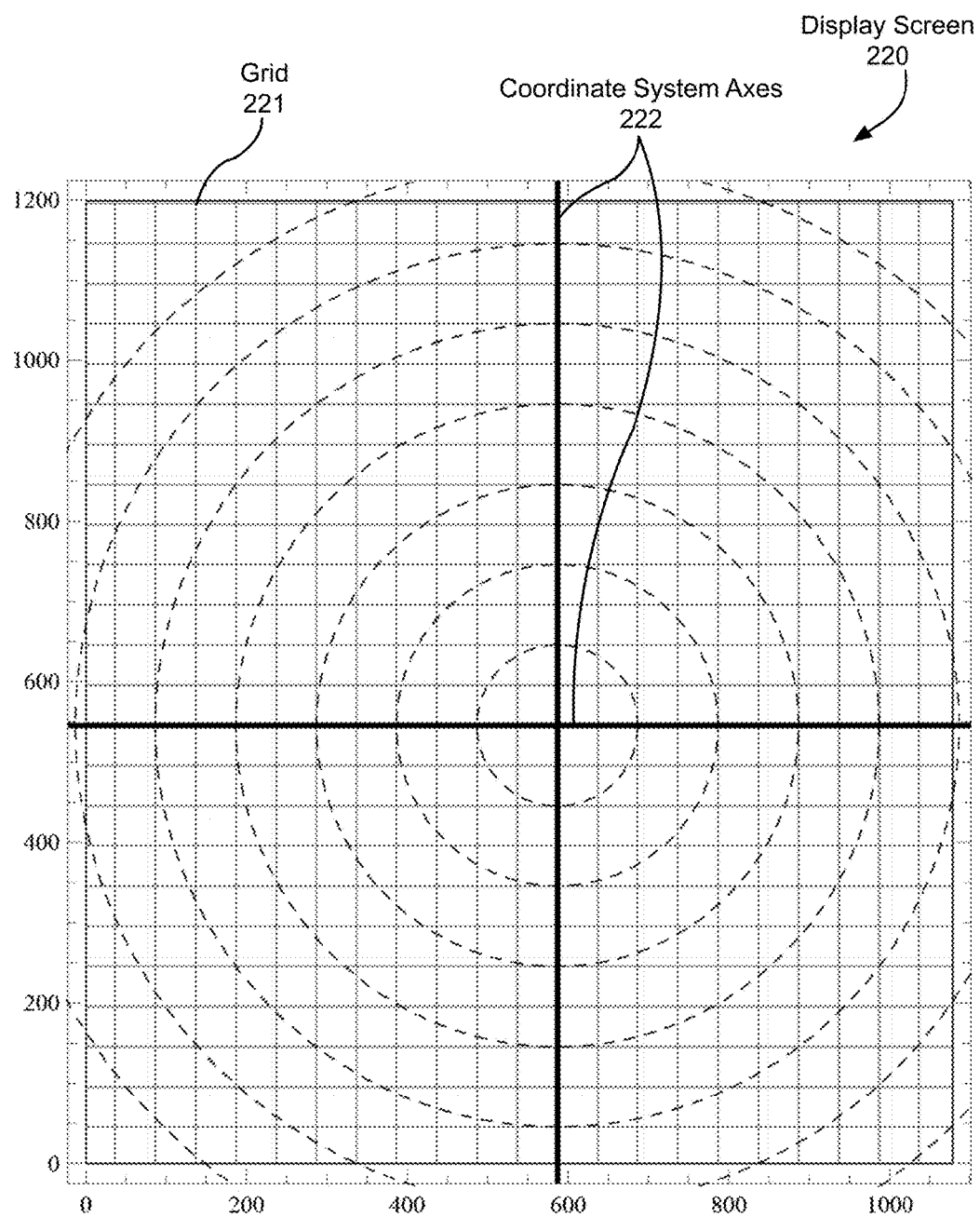
FIG. 2A illustrates a display screen of a heads mounted display (HMD), in accordance with one embodiment.

FIG. 2A illustrates a display screen 220 of a head mounted display (HMD), in accordance with one embodiment. Each eye views a display screen that is 1080×1200 pixels. Two functions are illustrated in FIG. 2A. The first function is a grid 221 that illustrates the distance between pixels on the display screen. The grid 221 in FIG. 2A is uniform (each cell is 120 pixels square), as one would expect (the display screen pixels are uniform in size). A second function, a series of radial symmetric circles (shown as dashed lines), represents constant-valued sample points of a lens distortion function that will be described below. Coordinate system axes 222 are centered on the lens and the lens distortion function.

Figure 2B:
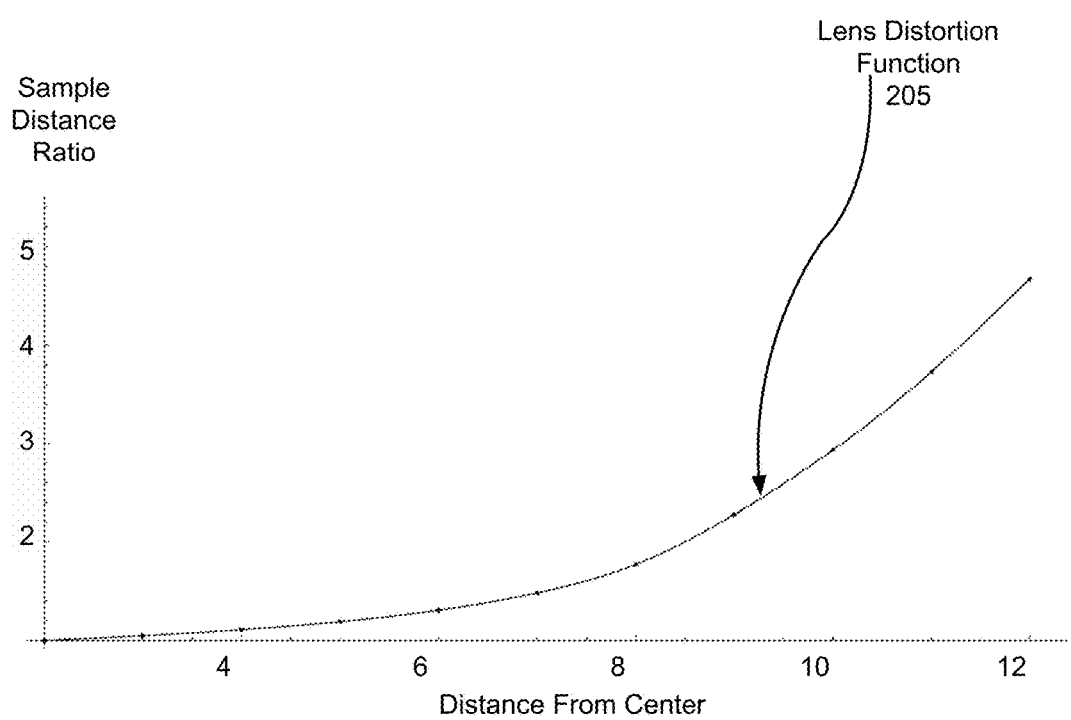
FIG. 2B illustrates a lens distortion function of the display screen shown in FIG. 2A, in accordance with one embodiment.

FIG. 2B illustrates a lens distortion function 205 shown in FIG. 2A, in accordance with one embodiment. The lens distortion function 205 is a property of the optical lenses used in VR display systems, which distort the image projected from a display before it is seen by the eye. The distortion effect caused by the lens is the inverse of the distortion caused by a "fisheye lens" in photography. The lens distortion function describes the transformation, by varying sampling distance, that should be applied to rendered images to reverse the lens distortion so that the viewer sees a non-distorted image. In one embodiment, the transformation is an approximation of a reverse lens distortion function that is applied to reverse the lens distortion of a particular lens.

In FIG. 2B, the sampling distance at the center point of the lens is the baseline sampling distance, so the ratio of required sampling distance vs center point sampling distance is 1.0 at this point. As the distance from the center of the lens increases (shown as the horizontal axis), the sampling distance between each pixel of the final display screen also increases non-linearly (shown as the vertical axis). If an image is first rendered to a render target that uses a constant sampling distance (matching the sampling rate required for the center of the lens), and then remapped afterwards to display frame buffer pixels, then at the edges of the lens, there will be an excess of frame buffer pixels relative to the number of samples needed for the display. Multiple pixels of the render target will be averaged together to produce each pixel of the display screen. Efficiency may be improved by reducing the number of pixels of the render target that are used to produce each pixel of the display screen to approximately one.

Figure 2C:
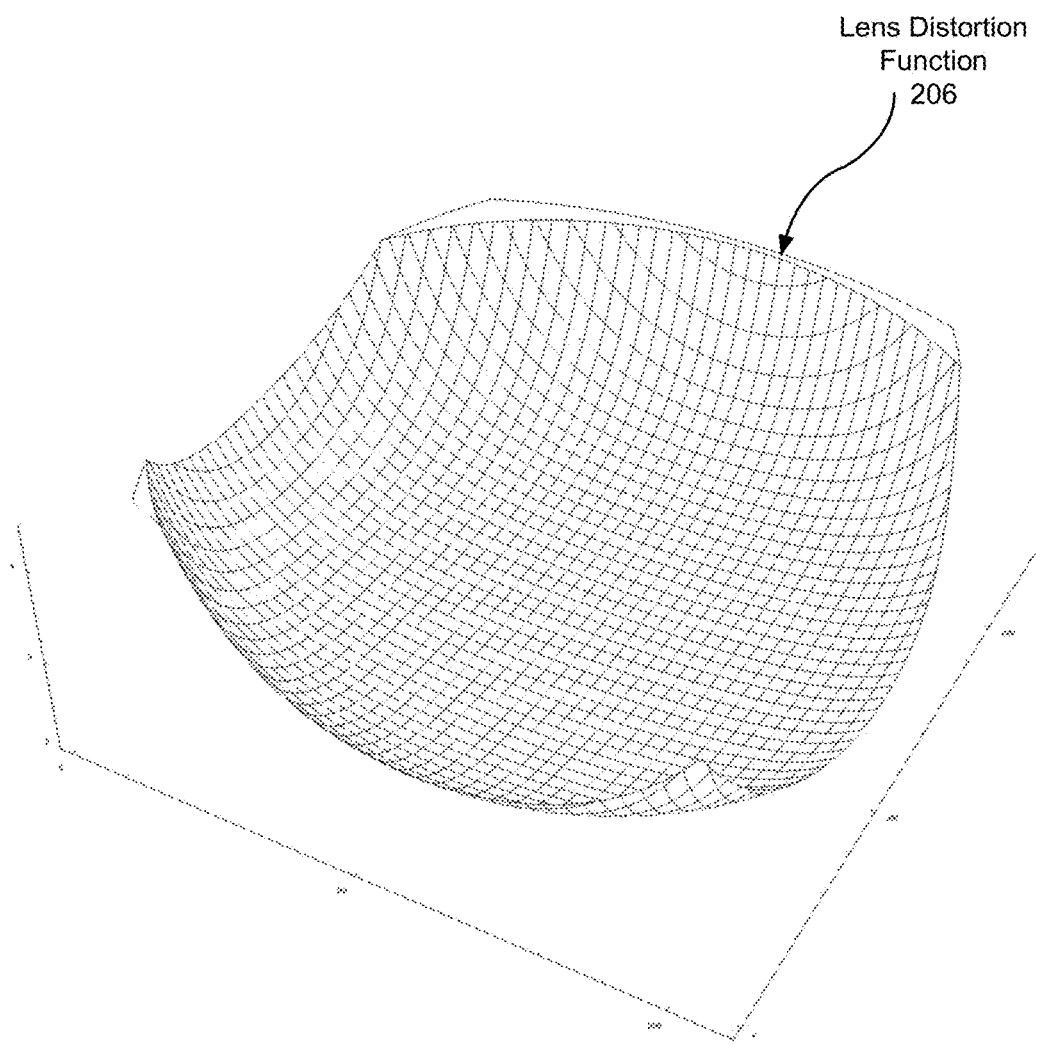
FIG. 2C illustrates the lens distortion function (ratio of sampling distance vs sampling distance at the lens center) of FIG. 2B as a lens distortion function of two dimensional display position rather than as a function of radial distance from the lens center, in accordance with one embodiment.

FIG. 2C illustrates the lens distortion function 205 (ratio of sampling distance compared with sampling distance at the lens center) of FIG. 2B as a lens distortion function 206 of two dimensional display position rather than as a function of radial distance from the lens center, in accordance with one embodiment. In the corners of the display screen 220, the sampling distance is large (i.e., greater than 5).

Figure 2D:
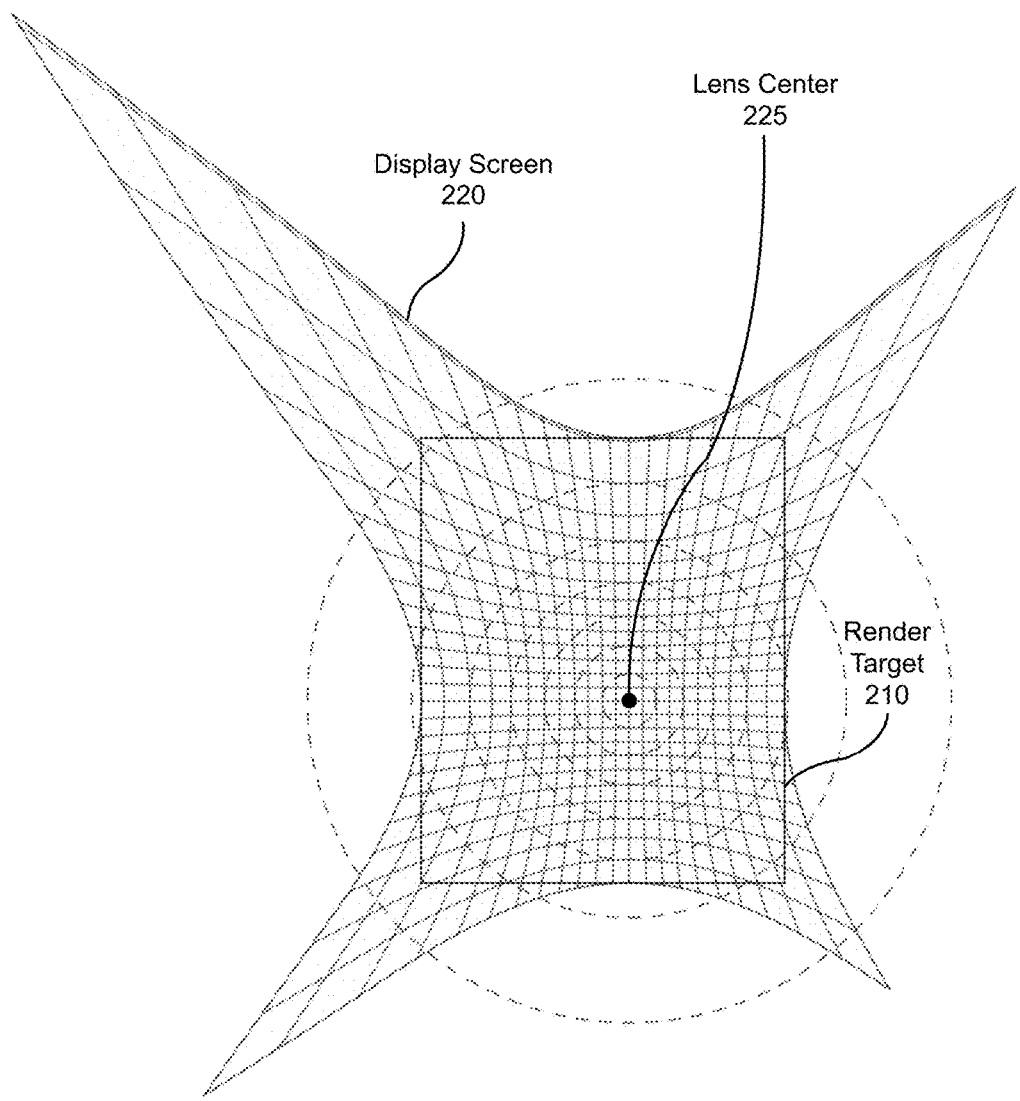
FIG. 2D illustrates sampling grid shown in FIG. 2A transformed via the lens distortion function shown in FIG. 2B, in accordance with one embodiment.

FIG. 2D illustrates sampling grid shown in FIG. 2A transformed via the lens distortion function 205 shown in FIG. 2B. In this figure, the intersections in the grid still represent required sample positions in the final display framebuffer, but now the grid looks warped, sampling positions in the periphery are spaced further apart as a result of the lens distortion function. The render target boundary 210 represents a framebuffer that is covering a subset of the display framebuffer. In one embodiment, the render target pixel resolution is selected so that the sampling distance at the pixel center matches the sampling distance required by the display, and the render target resolution is 1360×1660 pixels (larger than the resolution of the HMD display screen). Note that the corners of the display screen 220 are not covered by the render target 210; the render target 210 would have to be made even larger to cover the pixels in the corners of the display screen 220. Note also because the size of the warped overlay grid increases towards the corners of the render target 210, the render target 210 is generating more pixels than are needed to match the sampling rate required by the final display screen 220 in these regions. As shown in FIG. 2C, in this embodiment, the lens center 225 of the HMD display screen 220 happens to be positioned off-center relative to the render target 210.

Figure 2E:
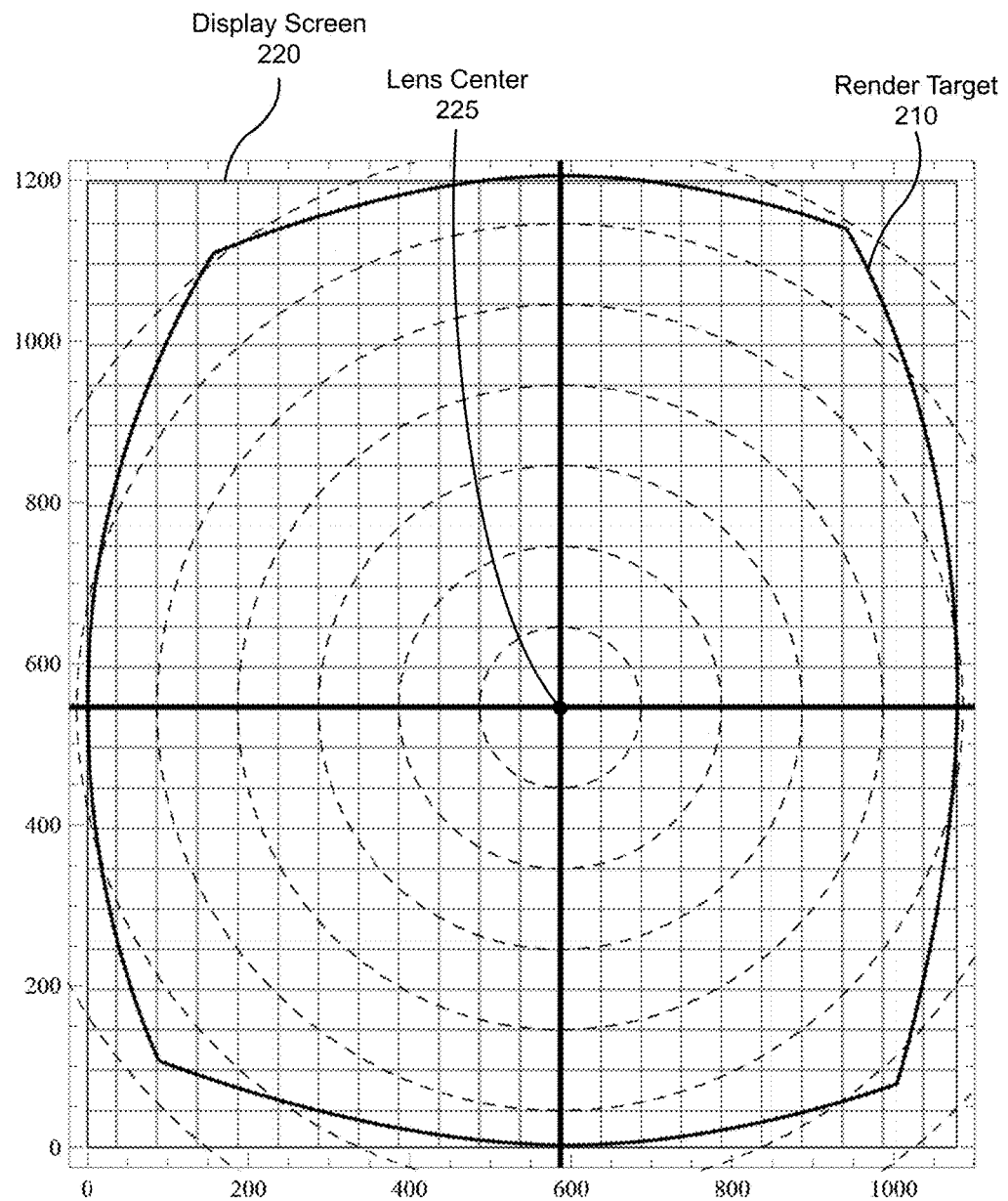
FIG. 2E is the same as FIG. 2A, with the render target boundary from FIG. 2D added to the illustration.

FIG. 2E is the same as FIG. 2A, with the render target boundary 210 from FIG. 2D added to the illustration. As noted above, the rendered pixels do not cover the entire HMD display screen 220.

Given a goal to determine a horizontal and vertical resolution for a render target 210 that at least fully covers the display pixels that are either horizontally or vertically aligned to the lens center, the resolution of the render target 210 may be determined by computing, at the lens center 225, the first derivative of the lens distortion function 205 in the X and Y directions. The first derivative is roughly the size of a displayed pixel in screen-space, so the reciprocal of the first derivative corresponds to the resolution of the render target 210 that is needed to ensure at least one pixel of the render target 210 contributes to each pixel of the display screen 220. When an image is rendered using a sampling rate based on the first derivative of the lens distortion function 205, the ratio of rendered pixels to displayed pixels is 1.74:1, and is therefore inefficient.

By algorithmically modifying the vertex coordinates of rendered geometry, it is possible to render a view with a sampling rate/spacing that is variable. In one embodiment, the w coordinate is modified to effectively "shrink" the primitive by an increasing (variable) amount as the distance from the lens center 225 increases. Using a fixed sampling distance across the shrunk primitive is equivalent to using a variable sampling distance across the original primitive, so the technique of modifying the w coordinate achieves the desired effect. By increasing the w coordinate as a linear function of the x coordinate and the y coordinate the number of rendered pixels for each display screen pixel may be reduced as the distance from the lens center 225 increases. In this embodiment, a modified w coordinate, w' is computed as a linear function w'=w+Ax+By, where w is the w coordinate computed for a vertex during vertex shading or after vertex shading and before the perspective divide and viewport transform is applied. The linear function may be represented by a linear transform:

$$\begin{bmatrix} x \\ y \\ z \\ w' \end{bmatrix} = \begin{bmatrix} 1 & 0 & 0 & 0 \\ 0 & 1 & 0 & 0 \\ 0 & 0 & 1 & 0 \\ A & B & 0 & 1 \end{bmatrix} \cdot \begin{bmatrix} x \\ y \\ z \\ w \end{bmatrix}$$

Varying the values of the A and B projective distortion factors changes the distortion function. If the A and B projective distortion factors are zero then the w coordinate is unchanged. For a given AB projective distortion factor pair, the required resolution of the render target may be computed. The render target resolution determines how many pixels need to be shaded to produce an image for display by the display system. Because the A and B projective distortion factors may be fixed values for a given lens system the values of the A and B projective distortion factors that minimize the number of pixels that are rendered, and more specifically, shaded. In one embodiment, the determinant of the first derivative pair is computed as an approximation of the area of a display screen pixel mapped into the render target. For each AB projective distortion factor pair, a search is performed to identify the display screen pixel having the smallest area. The identified pixel is used to compute the resolution of the render target. In one embodiment, a search through a range of AB projective distortion factor values is performed to identify the AB projective distortion factor pair that minimizes the number of shaded pixels, as described in more detail in conjunction with FIG. 7E.

Modification of the w coordinate using a linear transform ensures that the portion of the graphics processing pipeline following vertex shading (e.g. clipping, perspective divide, viewport transform, raster, z-buffer, etc.), will function properly. Importantly, an application that is not designed for display by an HMD may be executed without any modification to the application to produce images for display by the HMD. In one embodiment, a software driver may be configured to enable modification of the w coordinates when the application is executed to efficiently produce images for display by the HMD. In one embodiment, one or more coordinates other than the w coordinate are modified using a linear transform to vary the sampling rate used to render the images for display by the HMD.

Figure 3:
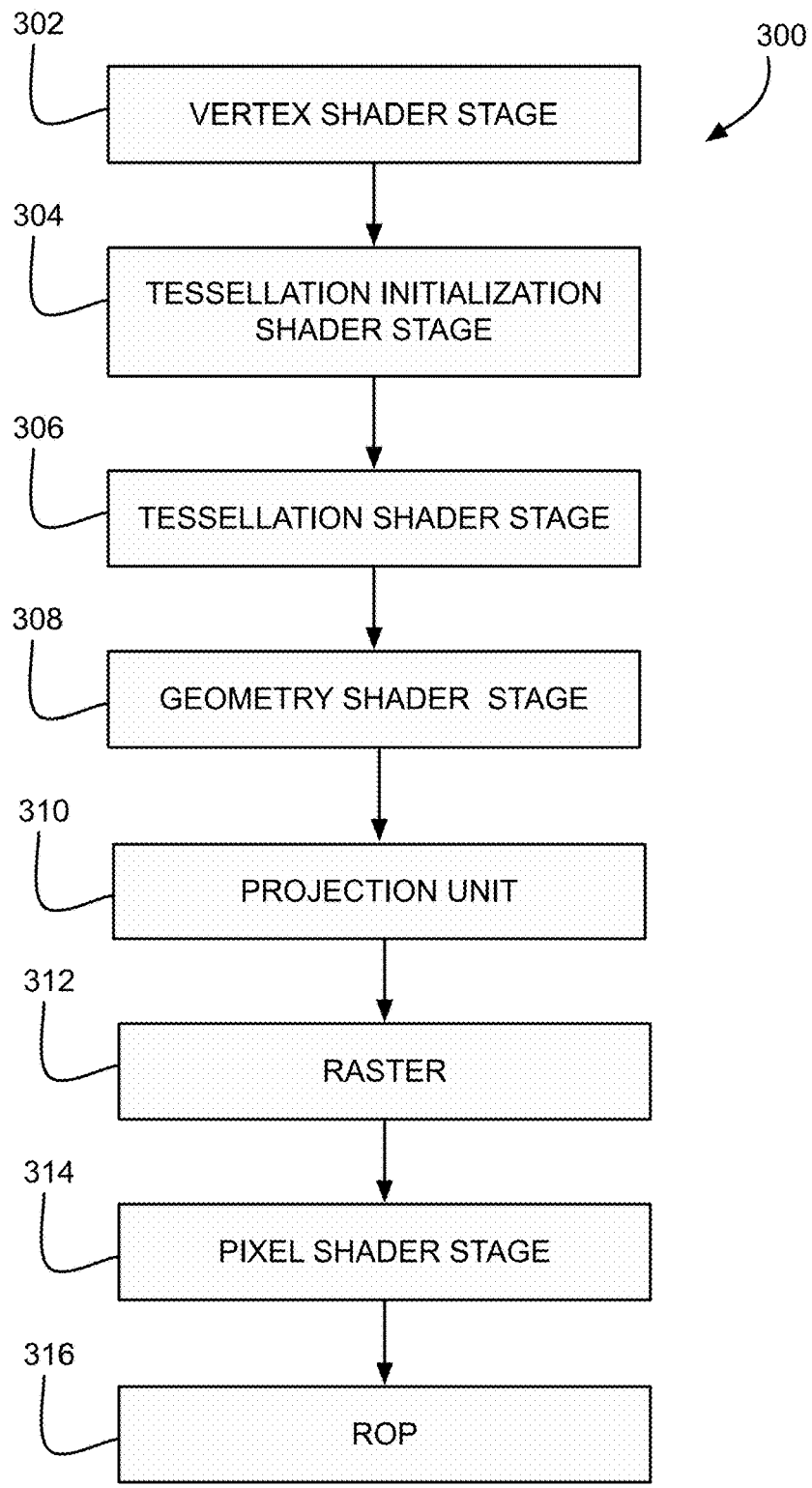
FIG. 3 illustrates a graphics processing pipeline, in accordance with one embodiment.

FIG. 3 illustrates a graphics processing pipeline 300, in accordance with one embodiment. As an option, the graphics processing pipeline 300 may be implemented in the context of the functionality and architecture of the previous Figures and/or any subsequent Figure(s). Of course, however, the graphics processing pipeline 300 may be implemented in any desired environment. It should also be noted that the aforementioned definitions may apply during the present description.

As shown, the graphics processing pipeline 300 may include at least one vertex shader stage 302. The graphics processing pipeline 300 may also optionally include one or more of a tessellation initialization shader stage 304, a tessellation shader stage 306, a geometry shader stage 308, and a pixel shader stage 314. In one embodiment, the vertex shader stage 302, the tessellation initialization shader stage 304, the tessellation shader stage 306, the geometry shader stage 308, the pixel shader stage 314, and/or hardware/software associated therewith, may represent stages of the graphics processing pipeline 300 (e.g. a "homogeneous coordinate space shader pipeline," or "shader pipeline," etc.).

Furthermore, in one embodiment, the graphics processing pipeline 300 may include a projection unit 310, a raster unit 312, and a raster operations (ROP) unit 316. Additionally, in one embodiment, the raster operations unit 316 may perform various operations on the shaded pixel data such as performing alpha tests, Z-test, stencil tests, and blending the shaded pixel data with other pixel data corresponding to other fragments associated with the pixel. When the raster operations unit 316 has finished processing the shaded pixel data, the shaded pixel data may be written to a display surface (i.e., render target such as a frame buffer, a color buffer, Z-buffer, or the like). The raster operations unit 316 may perform per-sample z-testing so that visible pixel data is written to the frame buffer and obscured pixel data is not written to the frame buffer.

In one embodiment, the shader stages (e.g., vertex shader stage 302, tessellation initialization shader stage 304, tessellation shader stage 306, geometry shader stage 308, and pixel shader stage 314) of the graphics processing pipeline 300 may be implemented by one or more programmable shader execution units. In one embodiment, the vertex shader stage 302, the tessellation initialization shader stage 304, the tessellation shader stage 306, the geometry shader stage 308, the pixel shader stage 314, and/or hardware/software associated therewith, may sequentially perform processing operations on data representing 3D graphics primitives (i.e., primitive data). Once the sequential processing operations performed by the shader stages within the graphics processing pipeline 300 upstream of the projection unit 310 are complete, in one embodiment, the projection unit 310 may utilize the data. In one embodiment, primitive data processed by one or more of the shader stages within the graphics processing pipeline 300 may be written to a cache (e.g. L1 cache, a vertex cache, etc.). In this case, in one embodiment, the projection unit 310 may access the data in the cache. In the context of the present description, the projection unit 310 refers to any graphics processor related unit or units capable of transforming a three dimensional position of a vertex in virtual space to a two-dimensional coordinate (e.g. capable of being utilized for display, etc.). In one embodiment, the projection unit 310 and the raster unit 312 are implemented as fixed operation circuitry.

In the context of the present description, a vertex shader stage refers to a program that manipulates individual vertex attributes such as position, color, and texture coordinates, or to any graphics processor related circuitry capable of manipulating individual vertex attributes such as position, color, and texture coordinates. Further, in the context of the present description, a tessellation shader refers to any unit or code associated with a graphics processor capable of being utilized to perform tessellation. Additionally, a geometry shader may refer to any unit or code that is capable of governing the processing of primitives (such as triangles). A pixel shader may refer to any unit or code that is capable of governing the processing of pixels.

The pixel shader 314 may generate shaded pixel data (i.e., shaded attributes such as color values) for a pixel such as by performing lighting operations or sampling texture maps using interpolated texture coordinates for the pixel. The shaded pixel data may be per-sample shaded attributes where one or more samples within a pixel share the same computed shaded attribute value or where a shaded attribute value is computed for each sample location within a pixel. The pixel shader 314 generates per-sample shaded pixel data that is transmitted to the raster operations unit 316.

In one embodiment, the projection unit 310 is configured to receive vertex coordinates from the vertex shader stage and process the vertex coordinates for at least one view. In the context of the present description, a projection unit 310 refers to any unit or group of units capable of performing clipping, culling, perspective correction, and viewport scaling operations on primitive data. Furthermore, projection unit 310 may be configured to apply a projective geometric distortion or modify the w coordinates for each vertex in homogeneous coordinate space before performing one or more of clipping culling, perspective correction, and viewport scaling operations. In one embodiment, the projection unit 310 may be configured to apply a projective geometric distortion to the w coordinates specifically for each view when multiple views are specified. In one embodiment, the projection unit 310 is configured to perform the steps 110, 120, and 130, shown in FIG. 1. In another embodiment, two or more projection states are defined, where each projection state may include at least one of a view definition and a projective geometric distortion to be applied to the w coordinates of one or more 3D primitives.

Figure 4A:
FIG. 4A illustrates a scene rendered without applying a projective geometric distortion, in accordance with one embodiment.
Figure 4B:
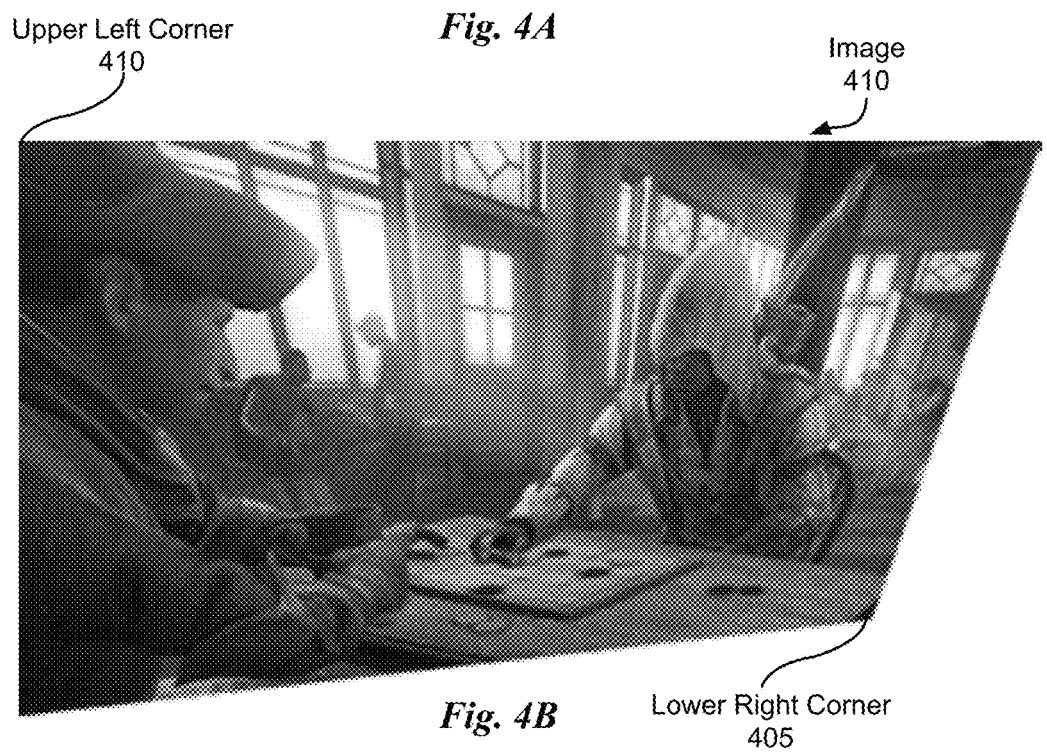
FIG. 4B illustrates the scene rendered with a projective geometric distortion applied, in accordance with another embodiment.

FIG. 4A illustrates a scene 400 rendered without applying a projective geometric distortion to the primitives that represent the scene 400, in accordance with one embodiment. FIG. 4B shows an illustration of the scene 400 rendered after a projective geometric distortion is applied to the entire view to produce image 410, in accordance with another embodiment. The projective geometric distortion that is applied to each w coordinate "shrinks" objects in the lower right corner 405 while objects in the upper left corner 410 are enlarged.

Figure 4C:
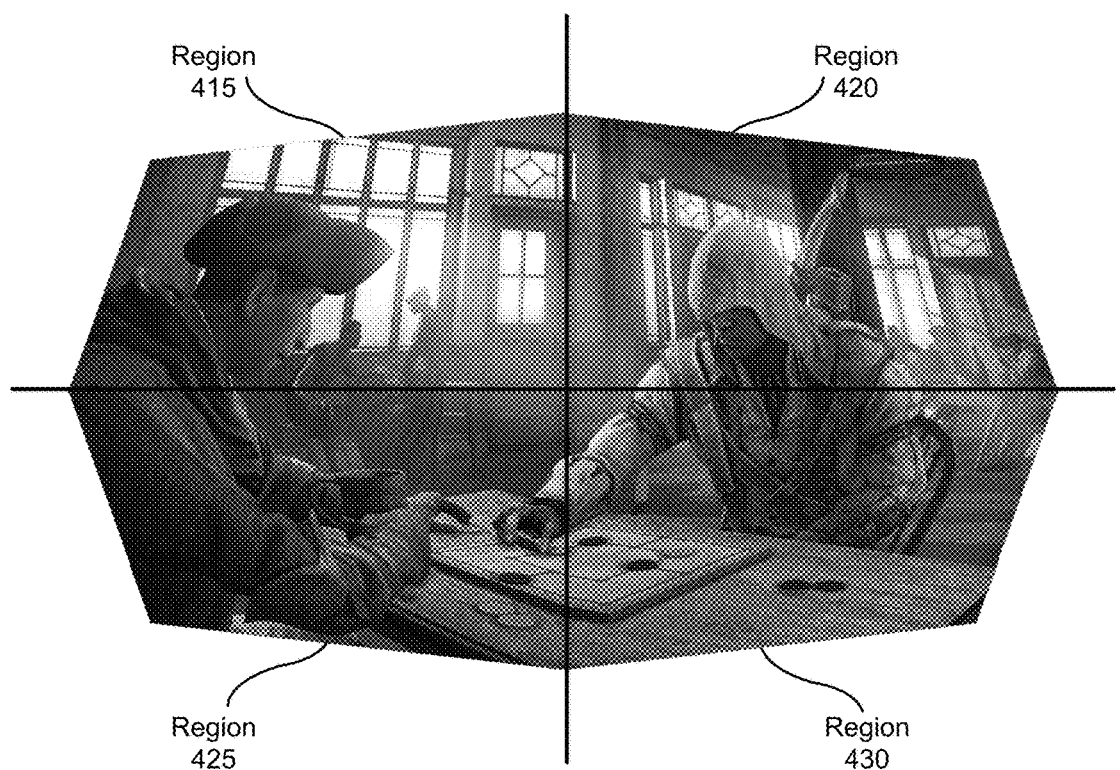
FIG. 4C illustrates the scene rendered with the display screen divided into four different regions using region-specific projective geometric distortions, in accordance with one embodiment.

FIG. 4C illustrates the scene 400 rendered with the display screen divided into four different regions 415, 420, 425, and 430 that each correspond to a different region-specific projective geometric distortion, in accordance with one embodiment. The display screen may be divided into quadrants (i.e., the four regions 415, 420, 425, and 430) at the lens center 225 and a pair of projective distortion factors (A and B) may be computed for each of the four regions 415, 420, 425, and 430. In each quadrant, samples of geometry located at the corner that touches the lens center may be preserved in their original proportions, or may be expanded, while at the opposing corner, the geometry is maximally shrunk from its original proportions. Each quadrant may be set up with a scissor operation to enable rendering in only the particular quadrant for each view. Vertices of primitives that do not intersect the quadrant may be discarded, so that only primitives within the quadrant are rendered by applying a projective geometric distortion to the w coordinates. In one embodiment, the projective distortion factors A and B are computed based on an approximate area of a display screen pixel in a render target.

Figure 5A:
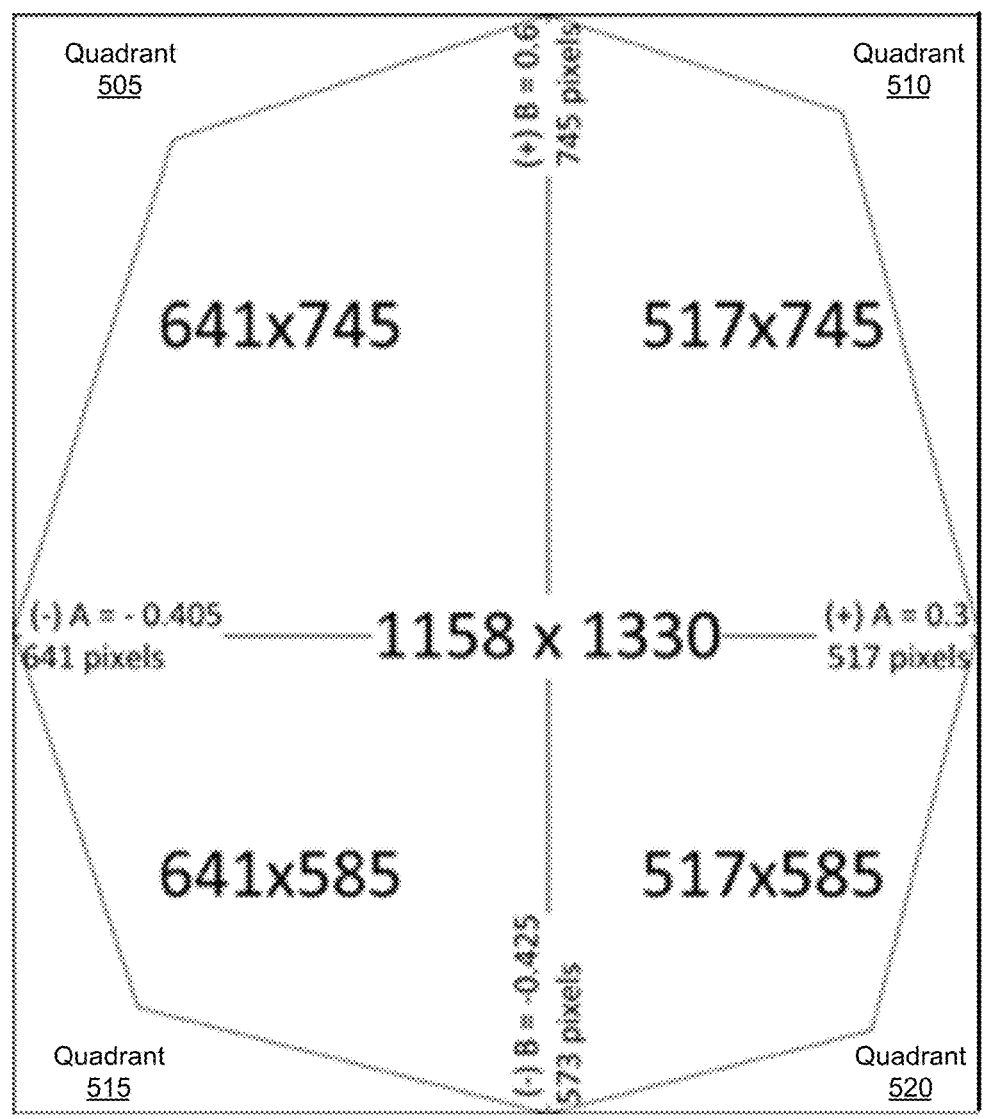
FIG. 5A illustrates view of a display screen including four different regions, in accordance with one embodiment.
Figure 5B:
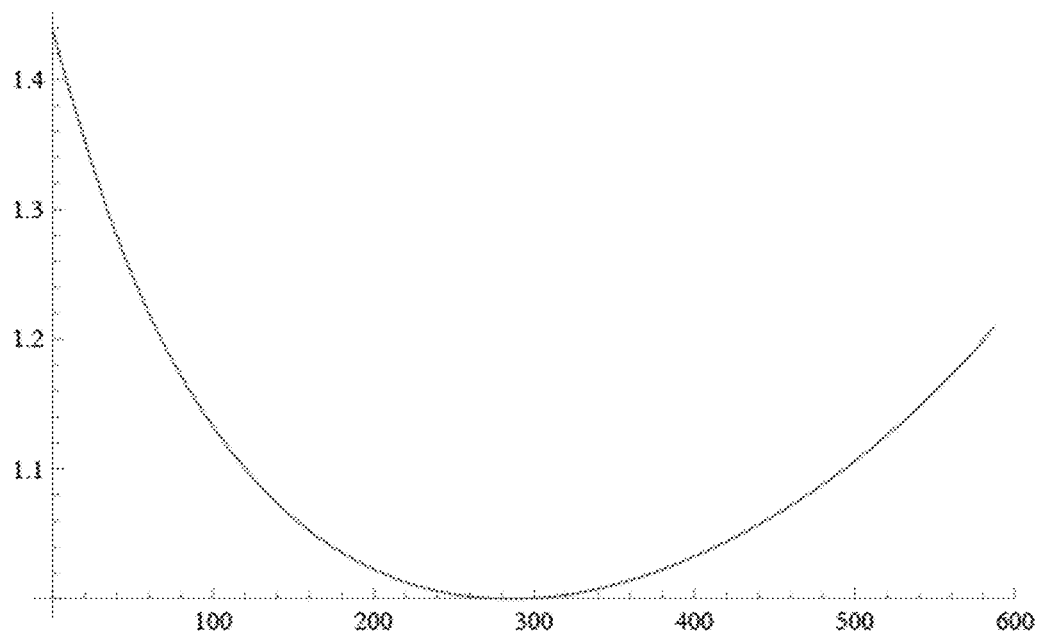
FIGS. 5B, 5C, 5D, and 5E illustrate the pixel dimensions along the region boundaries of FIG. 5A, in accordance with one embodiment.
Figure 5C:
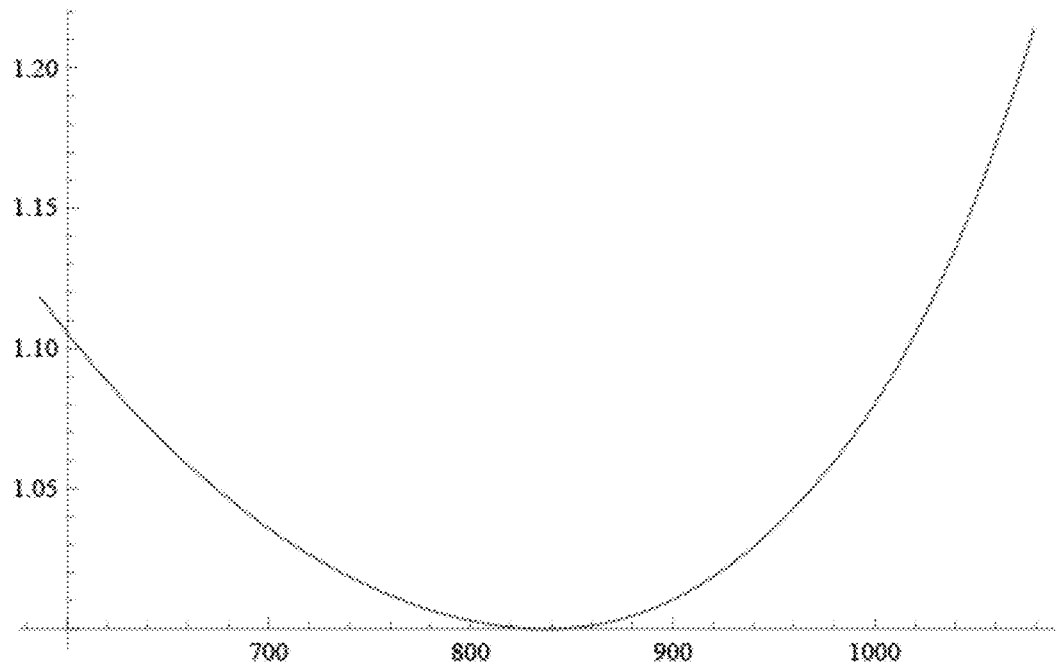
Figure 5D:
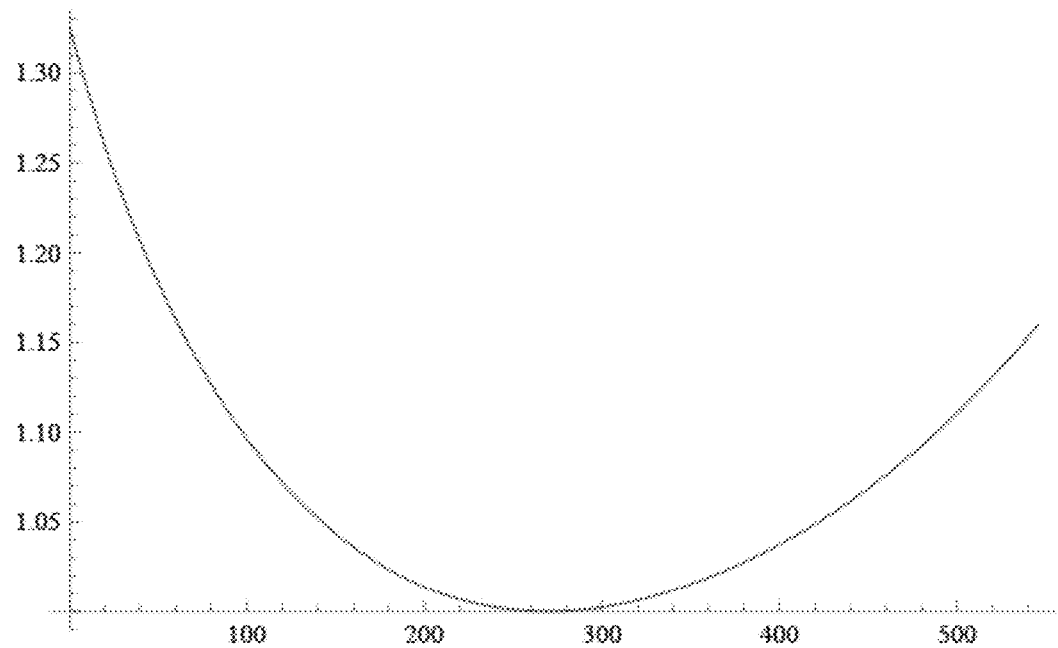
Figure 5E:
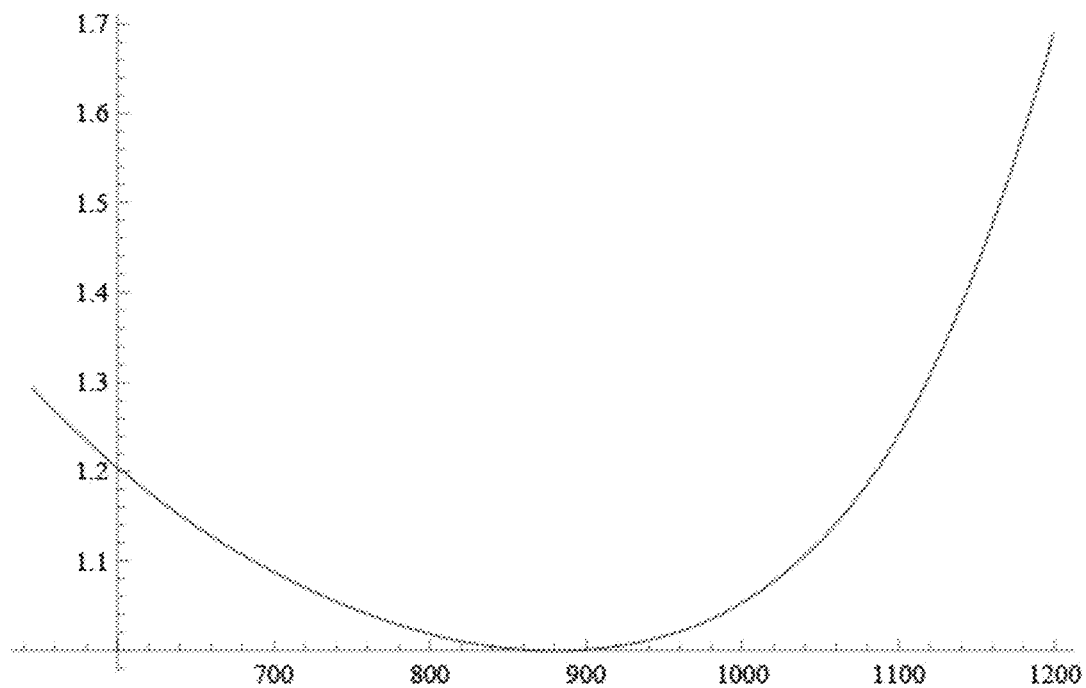

FIG. 5A illustrates a view of a display screen including four different regions, in accordance with one embodiment. Because the lens is off-center and there is a wider vertical field of view the projective distortion factors are computed to produce four different positive and negative X and Y coordinate pairs. The four pairs of projective distortion factors are optimized for each respective quadrant. Importantly, the projective distortion factors are consistent along the shared boundaries between the quadrants.

The minimum value of the first derivative of the lens distortion function may be computed to determine the number of pixels to be rendered or sampling rate for a given projective distortion factor. By varying the projective distortion factor the number of required pixels may be reduced compared with using conventional techniques. The projective distortion factors along the boundaries of the quadrants are considered to determine an optimal projective geometric distortion function along each of the quadrant boundaries.

In this embodiment, the resolution of the render target is 1158×1330 pixels. The pixel resolution for a first quadrant 505 is 641×745 and the projective distortion factors A and B are −0.0405 and +0.6, respectively. The pixel resolution for a second quadrant 510 is 517×745 and the projective distortion factors A and B are +0.3 and +0.6, respectively. The pixel resolution for a third quadrant 515 is 641×585 and the projective distortion factors A and B are −0.0405 and −0.425, respectively. The pixel resolution for a fourth quadrant 520 is 517×585 and the projective distortion factors A and B are +0.3 and +0.425, respectively.

Plotting the first derivative of the projective geometric distortion function along the quadrant boundaries illustrates that a display screen pixel width or pixel height is never smaller than a rendered pixel along a quadrant boundary. FIGS. 5B, 5C, 5D, and 5E illustrate the pixel dimensions along the quadrant boundaries, in accordance with one embodiment.

As shown in FIGS. 5B, 5C, 5D, and 5E, the sampling rate is sufficient along the quadrant boundaries. However, the sampling rate at or near the center of each quadrant is not necessarily sufficient. The determinant of the first derivatives may be plotted as a measure of pixel area to determine if the sampling rate is sufficient at or near the center of each quadrant.

Figure 6A:
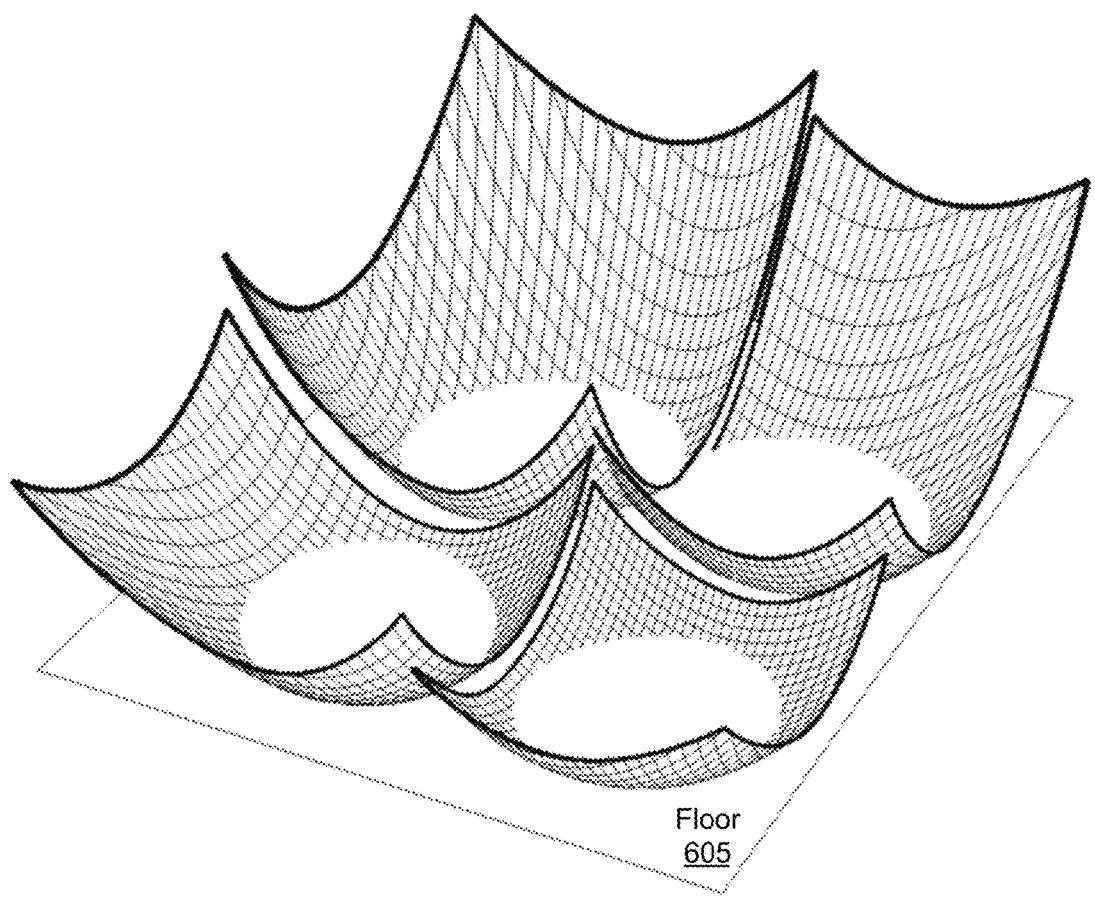
FIG. 6A illustrates pixel size in four regions with W coordinates with projective geometric distortions applied, in accordance with another embodiment.

FIG. 6A illustrates pixel size in four regions with based on w coordinates to which a projective geometric distortion has been applied, in accordance with another embodiment. The pixel size within each of the four regions shown in FIG. 6A has a floor value set at 1.0. Pixels that are above the "floor" 605 in each quadrant are rendered at a higher resolution than is necessary to produce each display screen pixel. Pixels that are below the floor 605 in each quadrant are rendered at a lower resolution than is necessary to produce each display screen pixel.

To compute projective distortion factors and sampling rates that minimize the number of pixels rendered while guaranteeing that there is at least one rendered pixel for every display screen pixel, the minimum determinant within each quadrant is determined. Because the rendered pixels should be roughly square, the square-root of the minimum determinant is used to determine the required render target pixel resolution. Finally, the larger of the computed dimensions of the render target is chosen for each of the axes dividing a pair of quadrants.

Figure 6B:
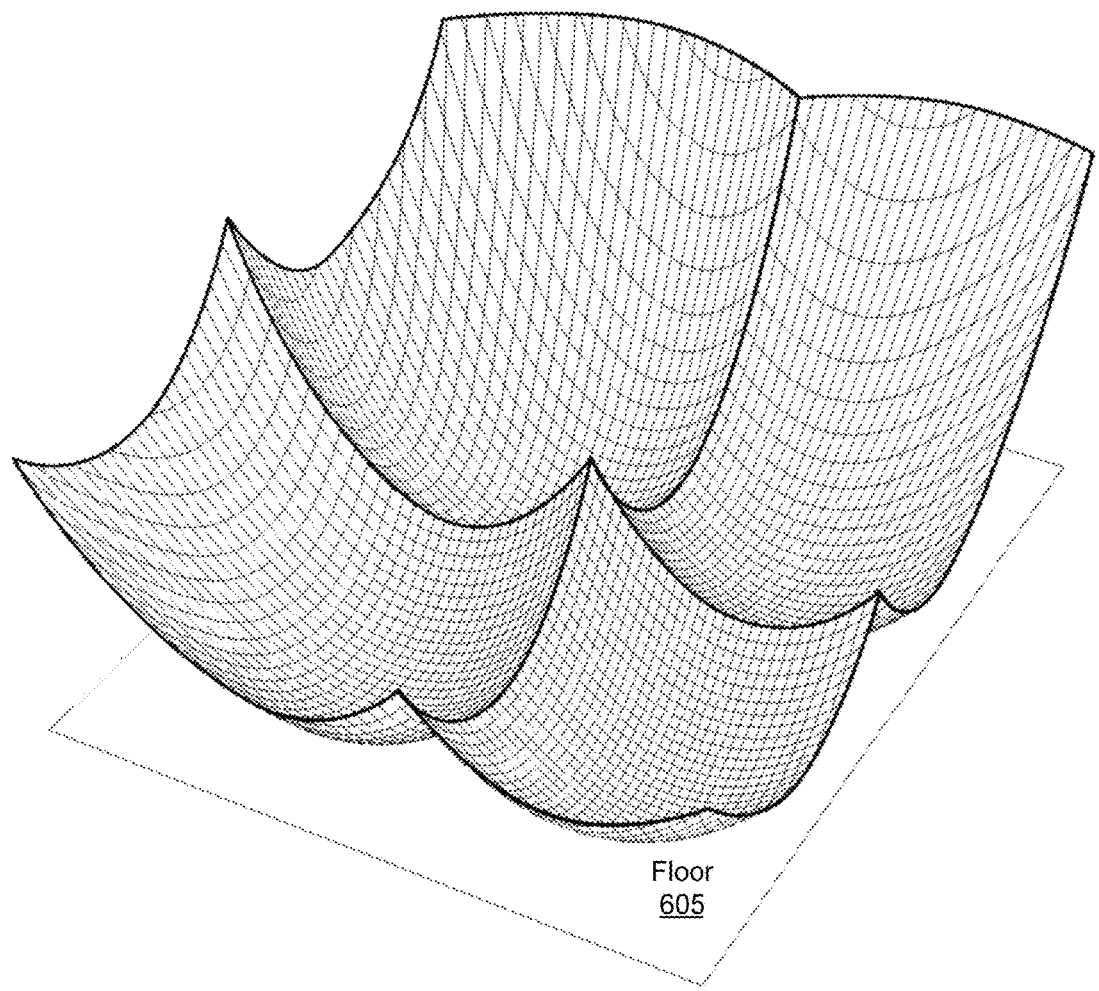
FIG. 6B illustrates pixel size in four regions with W coordinates with a projective geometric distortion applied in each region, in accordance with another embodiment.

FIG. 6B shows an illustration of pixel size in four regions with w coordinates to which a projective geometric distortion is applied based on a minimum determinant in each region, in accordance with another embodiment. Note that all of the rendered pixels in each of the quadrants are above the floor 605. In one embodiment, each of the different regions may correspond to a respective view.

Figure 6C:
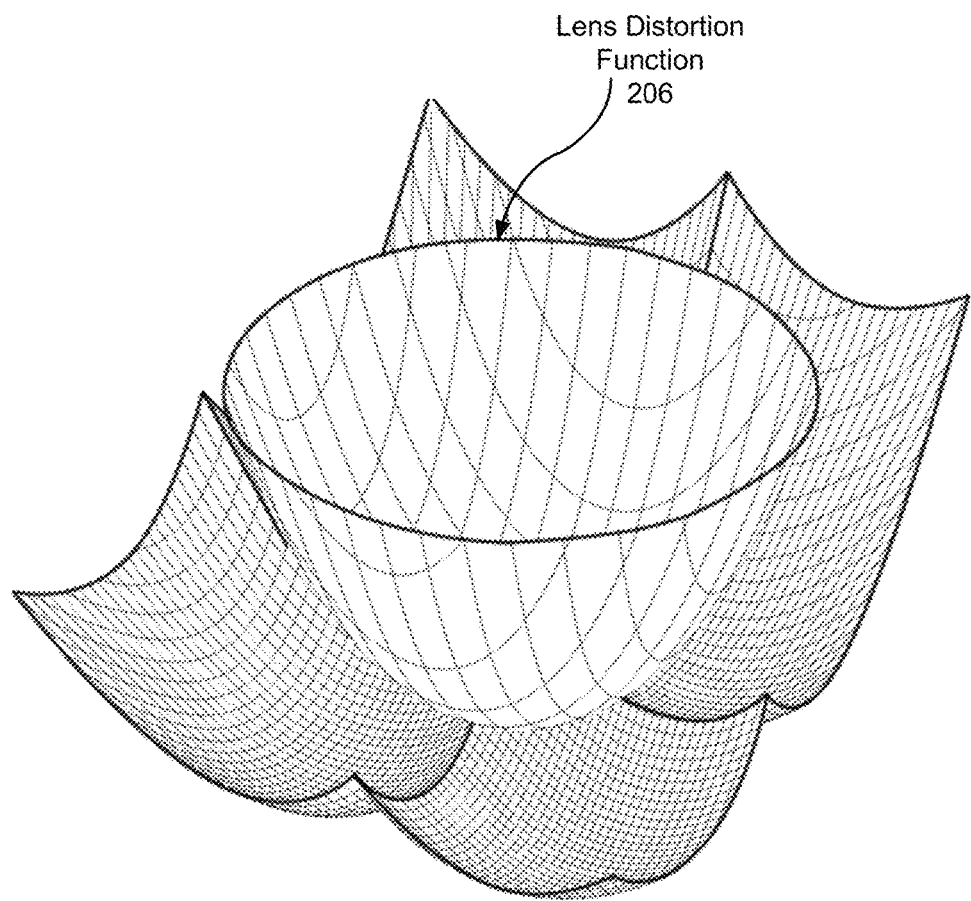
FIG. 6C illustrates the graph shown in FIG. 6B superimposed with the graph shown in FIG. 2B, in accordance with another embodiment.

FIG. 6C illustrates the graph shown in FIG. 6B superimposed with the lens distortion function 206 shown in FIG. 2C, in accordance with another embodiment. As shown in FIG. 6C, an additional optimization to reduce the number of shading operations may be performed by defining a fifth projective geometric distortion function that is used to render a region in the center of the display screen. In one embodiment, the graphics pipeline is configured to render five different images based on five different views that each correspond to a different region of the display screen, as shown FIG. 6E. In one embodiment, four views are rendered applying projective geometric distortions to the w coordinates and one central view is rendered without using a projective geometric distortion. In other words, the fifth projective geometric distortion function is an identity transformation that does not modify the w coordinates associated with the vertices of the primitives.

Figure 6D:
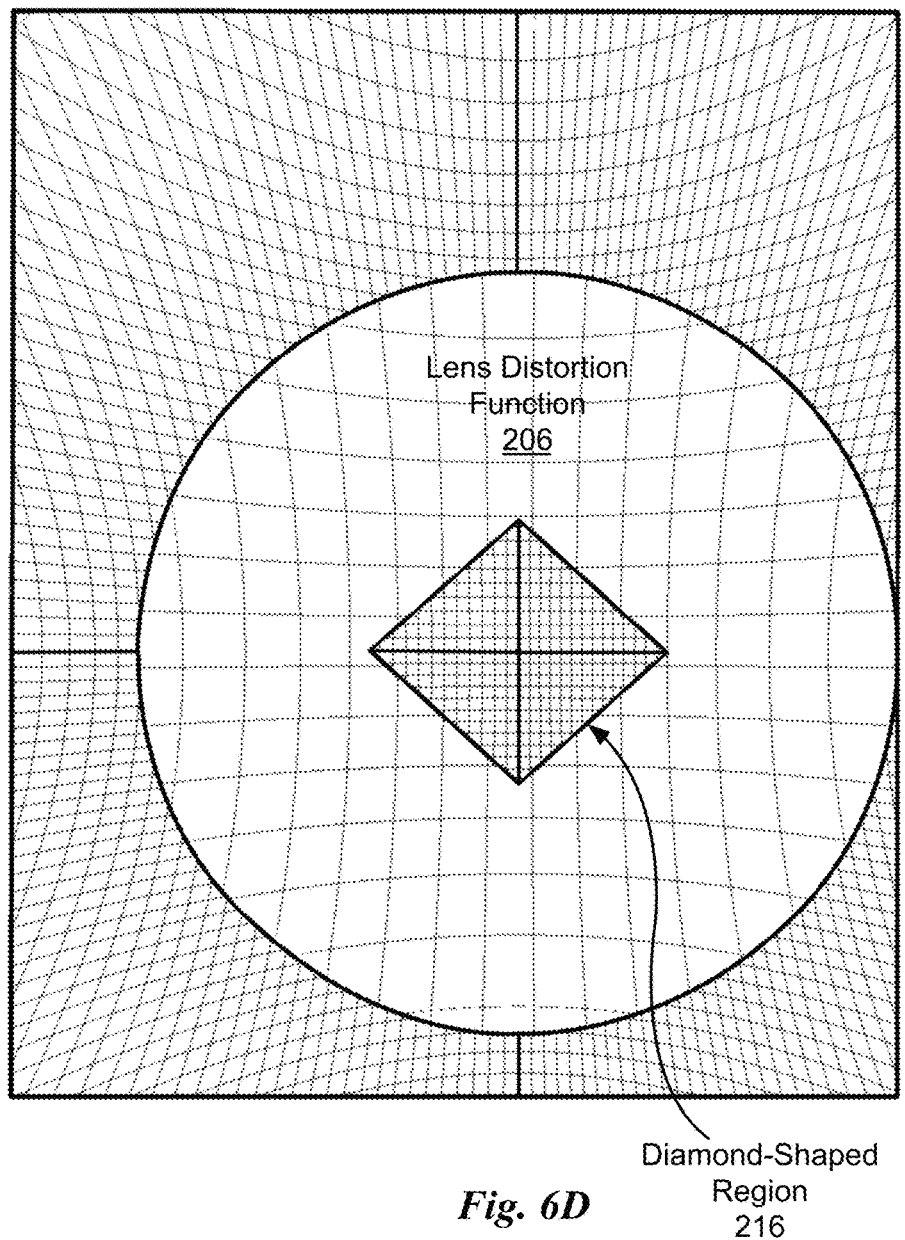
FIG. 6D illustrates a top view of FIG. 6C.

FIG. 6D illustrates a top view of FIG. 6C. Five regions are shown where the W coordinates are transformed in four of the regions to modify the pixel size, in accordance with another embodiment. Each quadrant corresponds to a different render target. Each quadrant is intersected by the lens distortion function 206 to form a diamond-shaped region 216 where the four quadrants meet. In one embodiment, an identity transformation may by applied when rendering a view corresponding to the diamond-shaped region 216.

The pixel shading savings may be determined by first computing the resolution of the four render targets corresponding to the four views. The perimeter of the four regions forms an octagon that includes about 1392400 rendered pixels compared with 1296000 pixels of the HMD display screen, so that 7.4% more pixels are shaded than is necessary. The savings resulting from rendering the diamond-shaped region 216 at lower resolution is computed as the area of the render target, reduced by the ratio of the pixel sizes between transformed w coordinates and w coordinates that are not transformed. For the example shown in FIG. 6D, the ratio is (1360*1660)/(19062)=62%. Computing the area of each triangle forming the diamond-shaped region 216 and subtracting the scaled (38%) area from the total resolution indicates that only approximately 4% more pixels are shaded than is necessary.

Figure 6E:
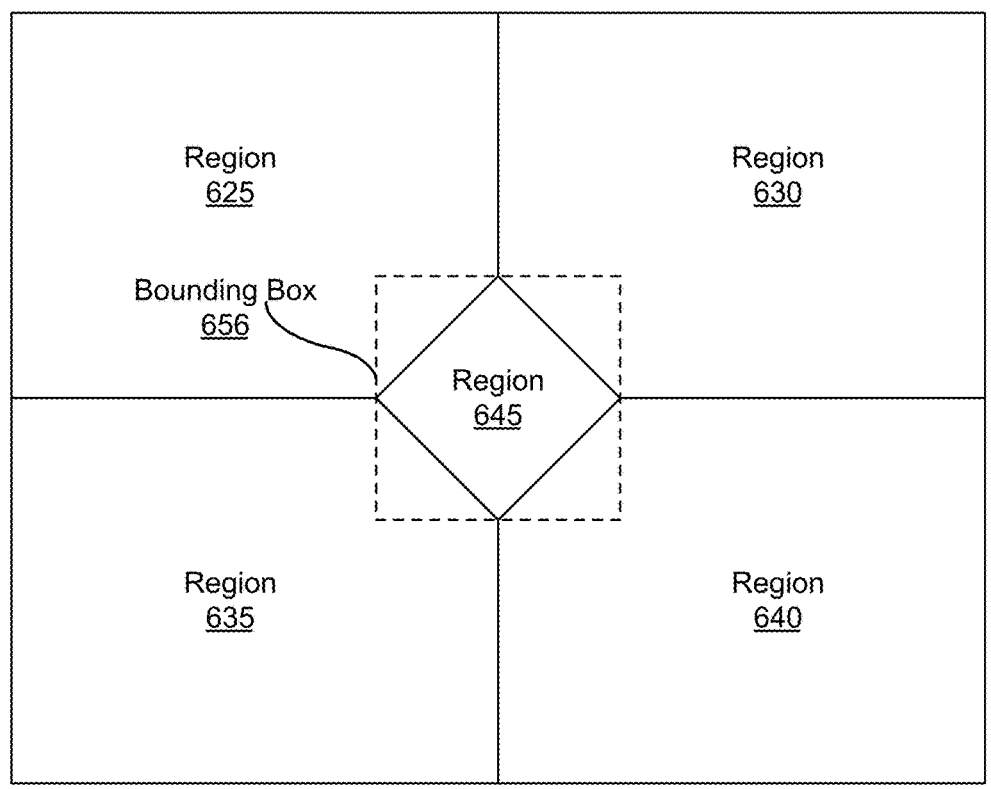
FIG. 6E illustrates the five regions of the display screen, in accordance with another embodiment.

FIG. 6E illustrates the five regions of the display screen 620, in accordance with another embodiment. A first region 625 is defined as the upper left quadrant of the display screen 620. A second region 630 is defined as the upper right quadrant of the display screen 620. A third region 635 is defined as the lower left quadrant of the display screen 620. A fourth region 640 is defined as the lower right quadrant of the display screen 620. A fifth region 645 is a central diamond-shaped region (e.g., diamond-shaped region 216) defined in a center portion of the display screen 620. Along the four boundaries between the fifth region 645 and each of the first, second, third, and fourth regions 625, 630, 635, and 640, the view-specific distortion factors are equal, i.e., A=B. Therefore, on the four boundaries, Ax+By is constant and w'=w+D, where D=a constant value Ax+By.

A scissor operation may be used after rasterization to discard primitives that are not inside of a bounding box 656 that encloses the fifth region 645. In one embodiment, a stencil operation may be applied before shading to carve out the fifth region 645 from the other four views. In another embodiment, a shading operation may be used after rasterization to carve out the fifth region 645.

In one embodiment, the view-specific distortion factors are specified that shuffle the components of vertices. For example, the view-specific distortion factors may correspond to a projective geometric distortion of a 90 degree rotation or mirroring operation. The following projective geometric distortion swaps the x and y component and x is negated and stored in y':

$$\begin{bmatrix} x' \\ y' \\ z' \\ w' \end{bmatrix} = \begin{bmatrix} 0 & 1 & 0 & 0 \\ -1 & 0 & 0 & 0 \\ 0 & 0 & 1 & 0 \\ 0 & 0 & 0 & 1 \end{bmatrix} \cdot \begin{bmatrix} x \\ y \\ z \\ w \end{bmatrix}$$

A projective geometric distortion that approximates a lens distortion function may be represented as:

$$\begin{bmatrix} x' \\ y' \\ z' \\ w' \end{bmatrix} = \begin{bmatrix} 0 & 1 & 0 & 0 \\ 0 & 1 & 0 & 0 \\ 0 & 0 & 1 & 0 \\ A & B & 0 & 1 \end{bmatrix} \cdot \begin{bmatrix} x \\ y \\ z \\ w \end{bmatrix}$$

Figure 7A:
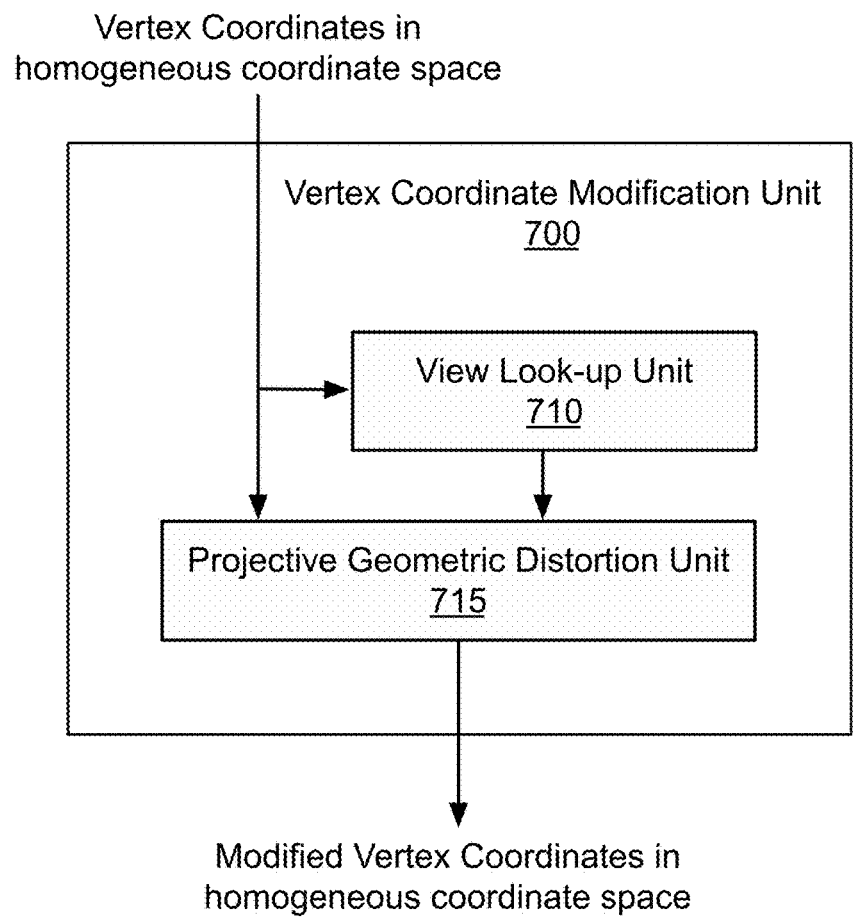
FIG. 7A illustrates a block diagram configured to perform a projective geometric distortion to produce a variable sampling rate, in accordance with one embodiment.

FIG. 7A illustrates a block diagram of a vertex coordinate modification unit 700 that is configured to perform a transformation of coordinates to render primitives using a variable sampling rate, in accordance with one embodiment. In one embodiment, the vertex coordinate modification unit 700 may be included in circuitry configured to perform the operations of the projection unit 310 shown in FIG. 3. In another embodiment, the vertex coordinate modification unit 700 may be included as circuitry between the vertex shader 302 and the projection unit 310 shown in FIG. 3. In one embodiment, the vertex coordinate modification unit 700 is fixed operation circuitry that processes shaded vertex data in homogeneous coordinate space.

The vertex coordinate modification unit 700 includes a view look-up unit 710 and a projective geometric distortion unit 715. The vertex coordinate modification unit 700 receives a shaded vertex in homogeneous coordinate space. The vertex may be defined by one or more of x, y, z, and w coordinates. A view identifier may be included with the vertex coordinates that identifies at least one view with which the vertex coordinates are associated. Each primitive is associated with a single view. A primitive may be broadcast or duplicated to provide separate copy of the primitive to each view of multiple views so that each primitive is associated with only one view. The view may correspond to the entire display screen or multiple views may be defined that each correspond to a different region of the display screen. The view look-up unit 710 receives the vertex coordinates and outputs, to the projective geometric distortion unit 715, the view-specific projective distortion factors that the primitive specified by the vertex coordinates intersects. The projective geometric distortion unit 715 transforms the vertex coordinates using the projective distortion factors to compute view-specific modified vertex coordinates. In some cases, the primitive specified by the vertex coordinates may not actually intersect the view. If so, the primitive will be clipped after being output by the vertex coordinate modification unit 700 to discard all or a portion of the primitive.

In one embodiment the projective geometric distortion unit 715 is configured to compute a modified w coordinate, w' as a linear function w'=w+Ax+By, where A and B are provided by the view look-up unit 710. In another embodiment, the projective geometric distortion unit 715 is configured to compute a modified w coordinate, w' is computed as a linear function w'=Ax+By+Cz+Dw, where A, B, C, and D are provided by the view look-up unit 710.

Figure 7B:
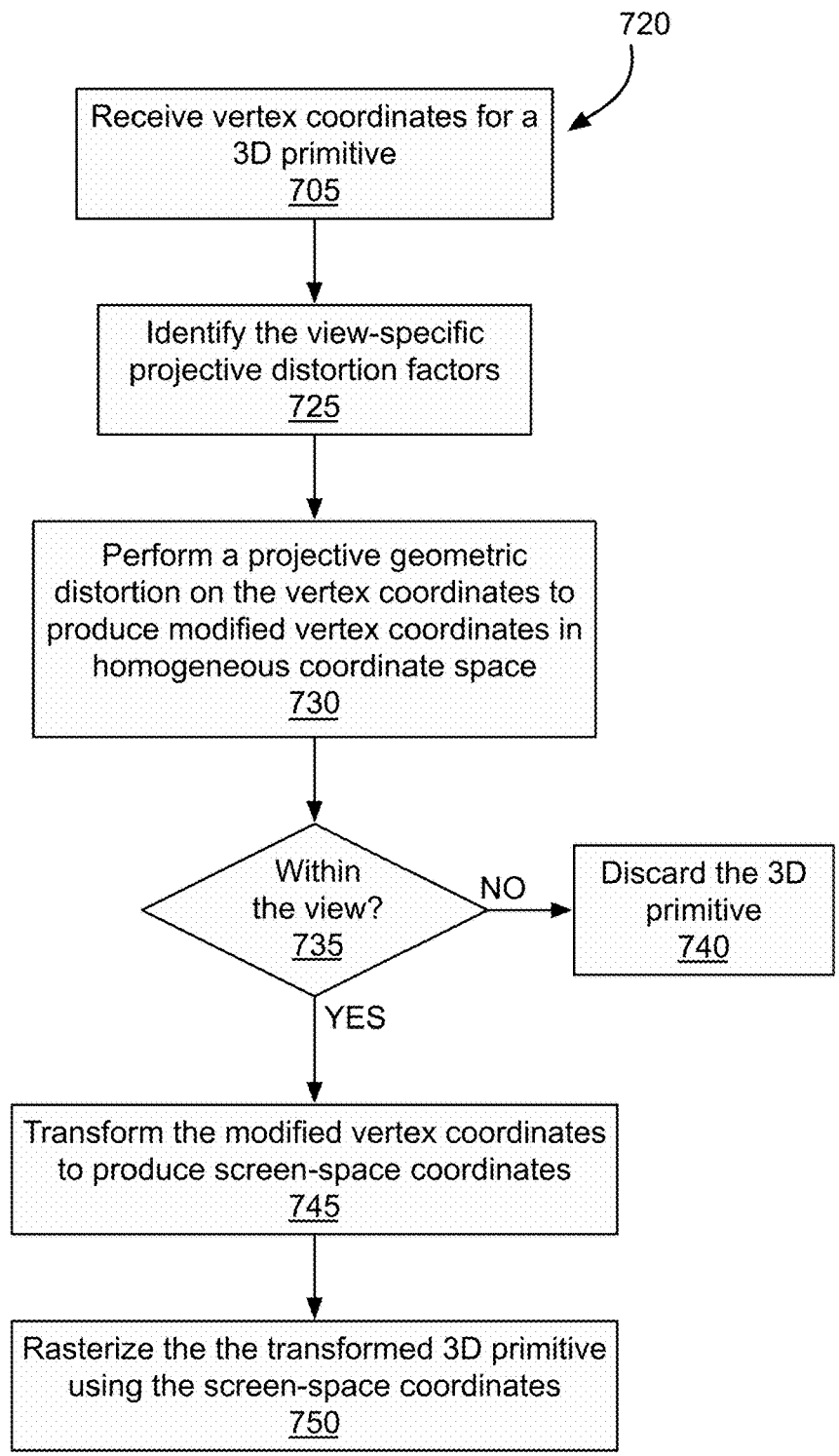
FIG. 7B illustrates a method for modifying vertex coordinates to vary a sampling rate, in accordance with one embodiment.

FIG. 7B illustrates a method 720 for modifying vertex coordinates to vary a sampling rate, in accordance with one embodiment. Although method 720 is described in the context of the graphics processing pipeline 300, the method 720 may also be performed by a program, software driver, custom circuitry, or by a combination of one or more of custom circuitry, a software driver, and a program. Furthermore, persons of ordinary skill in the art will understand that any system that performs method 720 is within the scope and spirit of embodiments of the present invention.

At step 705, vertex coordinates for a 3D primitive are received. At step 725, the view-specific projective distortion factors for a view intersected by the 3D primitive are identified and provided to the projective geometric transform unit 715. In one embodiment, a view identifier corresponding to the view is received with the vertex coordinates. At step 730, a projective geometric distortion is performed on the vertex coordinates using the view-specific projective distortion factors to produce modified vertex coordinates in homogeneous coordinate space.

At step 735, the vertex coordinate modification unit 700 determines if the primitive defined by the modified vertex coordinates is within the view, and, if not, then at step 740 the vertices defining the primitive are discarded. In one embodiment, vertex coordinates for the 3D primitives are broadcast (i.e., multi-cast) to multiple vertex coordinate modification units 700, where each vertex coordinate modification unit 700 corresponds to a different view. Therefore, at least steps 705, 725, 730, 735, and 740 may be performed in parallel for two or more view. Importantly, vertices may be shaded once and then one or more projective geometric distortions may be applied to the shaded vertices to generate modified vertices associated with each of the one or more projective geometric distortions. The vertex coordinates for the 3D primitives are stored once and multiple versions of modified vertex coordinates for a set of one or more of the 3D primitives may be generated by one or more vertex coordinate modification units 700.

In one embodiment, one or more of steps 725, 730, 735, and 740 are performed during execution of instructions within a shader program. In one embodiment, a driver program is configured to insert instructions into a geometry shader to perform one or more of steps 725, 730, 735, and 740. Multiple versions of modified vertex coordinates for a set of one or more of the 3D primitives may be generated by the geometry shader.

At step 745, the modified vertex coordinates are transformed from homogeneous coordinate space into screen-space to produce screen-space vertex coordinates. At step 750, and the 3D primitive is rasterized in screen-space using the screen-space vertex coordinates.

FIG. 7C illustrates a portion of a graphics processing pipeline 721 including the vertex coordinate modification unit 700, in accordance with one embodiment. The portion of the graphics processing pipeline 721 includes a clip unit 701, the vertex coordinate modification unit 700, a perspective divide unit 702, a viewport transform unit 703, and a scissor unit 704. In one embodiment, the portion of the graphics processing pipeline 721 is included within the projection unit 310 shown in FIG. 3. The portion of the graphics processing pipeline 721 may be configured to perform steps 705, 725, 730, 735, 740, and 745 of the method 720.

In one embodiment, the clip unit 701 is configured to discard any portion of a primitive specified by the modified vertex coordinates that are outside of a view. In one embodiment, the perspective divide unit 702 divides the vertex coordinates by the modified w coordinate, w' to produce perspective corrected vertex coordinates. In contrast, a conventional perspective divide operation divides the vertex coordinates by the unmodified w coordinate. In one embodiment, the viewport transform unit 703 is configured to perform a scaling and offset operation on the perspective corrected vertex coordinates to convert the homogeneous coordinate space perspective corrected vertex coordinates to screen space perspective corrected vertex coordinates. In one embodiment, the scissor unit 704 is configured to perform scissor operations on the screen space perspective corrected vertex coordinates before the primitives are rasterized.

FIG. 7D illustrates a portion of a graphics processing pipeline 722 including the vertex coordinate modification unit 700, in accordance with another embodiment. The portion of the graphics processing pipeline 722 also includes the clip unit 701, the vertex coordinate modification unit 700, the perspective divide unit 702, the viewport transform unit 703, and the scissor unit 704. In one embodiment, the portion of the graphics processing pipeline 722 is included within the projection unit 310 shown in FIG. 3. The portion of the graphics processing pipeline 722 may be configured to perform steps 705, 725, 730, 735, 740, and 745 of the method 720. However, compared with the portion of the graphics processing pipeline 721, in the portion of the graphics processing pipeline 722, the clipping is completed before the vertex coordinates are modified by the vertex coordinate modification unit 700.

Figure 7E:
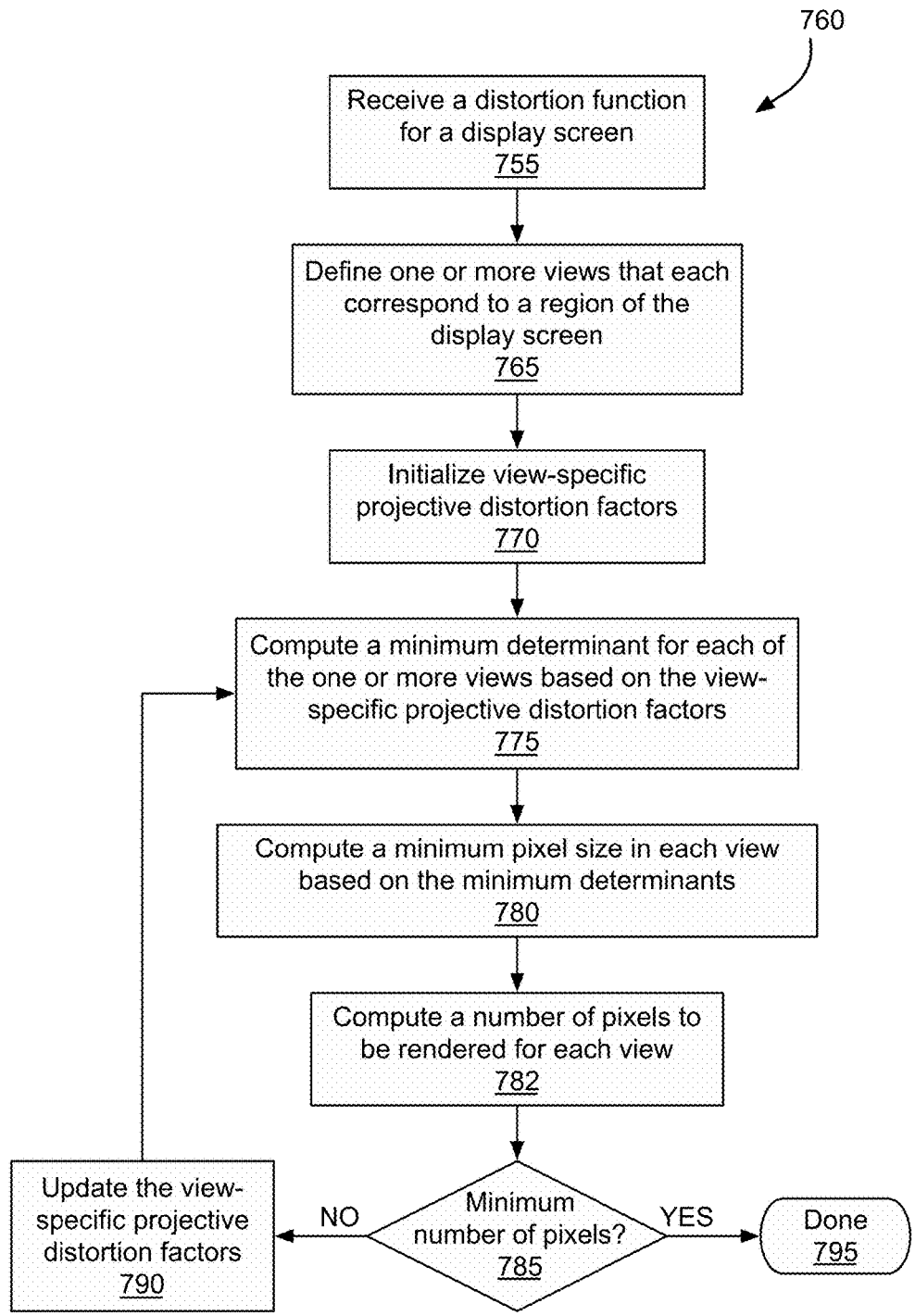
FIG. 7E illustrates a method for determining a variable sampling rate, in accordance with one embodiment.

FIG. 7E illustrates a method 760 for determining a variable sampling rate, in accordance with one embodiment for VR display applications. The variable sampling rate that is determined provides at least one render target pixel for each final HMD display screen pixel. Although method 760 is described in the context of the graphics processing pipeline 300, the method 760 may also be performed by a program, software driver, custom circuitry, or by a combination of one or more of custom circuitry, a software driver, and a program. Furthermore, persons of ordinary skill in the art will understand that any system that performs method 760 is within the scope and spirit of embodiments of the present invention.

At step 755, a lens distortion function for a display screen is received. In one embodiment, the lens distortion function approximates a reverse lens distortion function that is applied to reverse the optical distortion for a particular lens. At step 765, one or more views are defined that each corresponds to a region of the display screen, where each region is associated with a different portion of the distortion function. At step 770, view-specific projective distortion factors are initialized for each view. In one embodiment, the view-specific projective distortion factors are initialized with values intended to produce a minimum pixel size for each view of one pixel. In one embodiment, the view-specific projective distortion factors are initialized with values intended to minimize the number of pixels rendered for each view.

At step 775, a minimum determinant is computed for each of the one or more views based on the respective view-specific projective distortion factors. In one embodiment, the minimum determinant equals a minimum area of a pixel. At step 780, a minimum pixel size for each of the one or more views is computed based on the respective minimum determinant. In one embodiment, the minimum pixel size is the reciprocal or the square-root of the minimum determinant computed at step 775 for a view. In addition to controlling the minimum pixel size for a view, the projective distortion factors also control the number of pixels that are rendered for the view. Therefore, the projective distortion factors control the pixel resolution of the render target. For a particular view, a search is performed to find the projective distortion factors that minimize the number of pixels rendered while also maintaining a minimum pixel size, so that a desired image quality is achieved. A render target corresponding to each view has a width and height in pixels that is defined based on the particular display system.

At step 782, a number of pixels to be rendered for each view is computed based on the minimum pixel size and the render target dimensions. At step 785, the number of pixels to be rendered for each view is compared with any previously computed number of pixels for the respective view. When a minimum number of pixels to be rendered is reached for each of the views, the search is done at step 795. Otherwise, another iteration of steps 775, 780, 782, and 785 is performed after the view-specific projective distortion factors for at least one view are updated to different values.

The projective distortion factors for each of the one or more views correspond to a view-specific sampling rate (i.e., pixels rendered/view) and may be stored in the view look-up unit 710. In practice, applying the projective geometric distortion to the 3D geometry being rendered distorts the geometry to better match the optical qualities of a particular display system.

Figure 8:
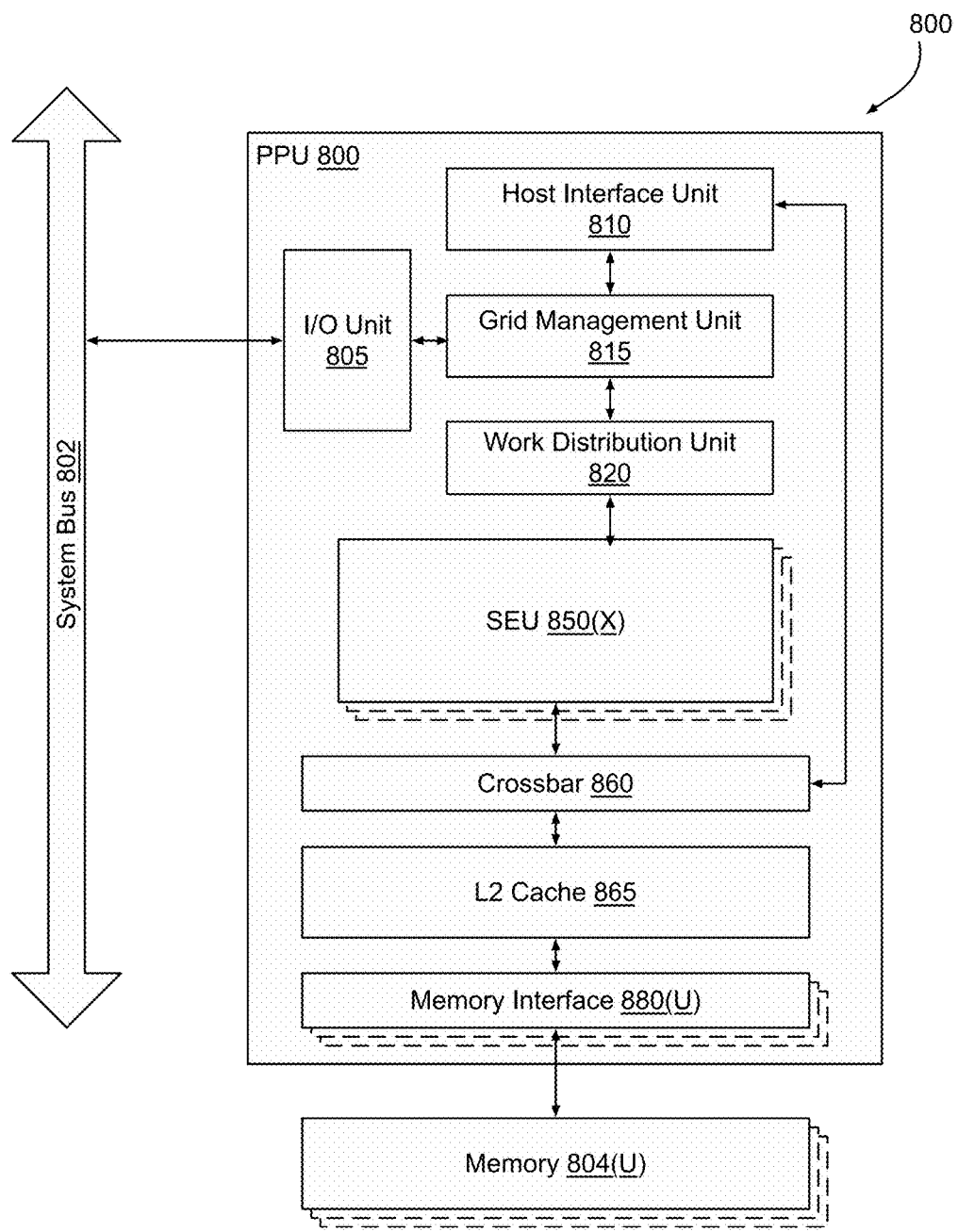
FIG. 8 illustrates a parallel processing unit, in accordance with one embodiment.

FIG. 8 illustrates a parallel processing unit (PPU) 800, in accordance with one embodiment. As an option, the PPU 800 may be implemented in the context of the functionality and architecture of the previous Figures and/or any subsequent Figure(s). Of course, however, the PPU 800 may be implemented in any desired environment. It should also be noted that the aforementioned definitions may apply during the present description.

While a parallel processor is provided herein as an example of the PPU 800, it should be strongly noted that such processor is set forth for illustrative purposes only, and any processor may be employed to supplement and/or substitute for the same. In one embodiment, the PPU 800 is configured to execute a plurality of threads concurrently in two or more programmable shader execution units (SEUs) 850. A thread (i.e. a thread of execution) is an instantiation of a set of instructions executing within a particular SEU 850. Each SEU 850, described below in more detail in conjunction with FIG. 9, may include, but is not limited to, one or more processing cores, one or more load/store units (LSUs), a level-one (L1) cache, shared memory, and the like. Each SEU 850 may operate as a shader stage with a combination of programmable and/or fixed operation circuitry.

In one embodiment, the PPU 800 includes an input/output (I/O) unit 805 configured to transmit and receive communications (i.e., commands, data, etc.) from a central processing unit (CPU) (not shown) over the system bus 802. The I/O unit 805 may implement a Peripheral Component Interconnect Express (PCIe) interface for communications over a PCIe bus. In alternative embodiments, the I/O unit 805 may implement other types of well-known bus interfaces.

The PPU 800 also includes a host interface unit 810 that decodes the commands and transmits the commands to the grid management unit 815 or other units of the PPU 800 (e.g. a memory interface 880, etc.) as the commands may specify. The host interface unit 810 is configured to route communications between and among the various logical units of the PPU 800.

In one embodiment, a program encoded as a command stream is written to a buffer by the CPU. The buffer is a region in memory, e.g., memory 804 or system memory, that is accessible (i.e., read/write) by both the CPU and the PPU 800. The CPU writes the command stream to the buffer and then transmits a pointer to the start of the command stream to the PPU 800.

In one embodiment, the PPU 800 comprises X SEUs 850(X). For example, the PPU 800 may include 16 distinct SEUs 850. Each SEU 850 is multi-threaded and configured to execute a plurality of threads (e.g., 32 threads) from a particular thread block concurrently. Each of the SEUs 850 is connected to a level-two (L2) cache 865 via a crossbar 860 (or other type of interconnect network). The L2 cache 865 is connected to one or more memory interfaces 880. Memory interfaces 880 implement 16, 32, 64, 128-bit data buses, or the like, for high-speed data transfer. In one embodiment, the PPU 800 comprises U memory interfaces 880(U), where each memory interface 880(U) is connected to a corresponding memory device 804(U). For example, PPU 800 may be connected to up to 6 memory devices 804, such as graphics double-data-rate, version 5, synchronous dynamic random access memory (GDDR5 SDRAM).

In one embodiment, the PPU 800 implements a multi-level memory hierarchy. The memory 804 is located off-chip in SDRAM coupled to the PPU 800. Data from the memory 804 may be fetched and stored in the L2 cache 865, which is located on-chip and is shared between the various SEUs 850. In one embodiment, each of the SEUs 850 also implements an L1 cache. The L1 cache is private memory that is dedicated to a particular SEU 850. Each of the L1 caches is coupled to the shared L2 cache 865. Data from the L2 cache 865 may be fetched and stored in each of the L1 caches for processing in the functional units of the SEUs 850.

In one embodiment, the PPU 800 comprises a graphics processing unit (GPU). The PPU 800 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g. in a model-space coordinate system, etc.) as well as attributes associated with each vertex of the primitive. The PPU 800 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 815 may configure one or more SEUs 850 to execute a vertex shader program that processes a number of vertices defined by the model data. In one embodiment, the GMU 815 may configure different SEUs 850 to execute different shader programs concurrently. For example, a first subset of SEUs 850 may be configured to execute a geometry shader program while a second subset of SEUs 850 may be configured to execute a pixel shader program. The first subset of SEUs 850 processes vertex data to produce processed vertex data and writes the processed vertex data to the L2 cache 865 and/or the memory 804. In one embodiment, instructions may be included in the geometry shader program to apply a projective geometric distortion to one or more vertex coordinates and generate modified vertex coordinates. In one embodiment one or more SEUs 850 may include one or more vertex coordinate modification units 700 that are each configured to perform an arithmetic operation on one or more vertex coordinates and generate modified vertex coordinates. In one embodiment, one or more vertex coordinate modification units 700 are each configured to apply a projective geometric distortion to one or more vertex coordinates and generate modified vertex coordinates.

After the processed vertex data is rasterized (i.e., transformed from three-dimensional data into two-dimensional data in screen space) to produce fragment data, the second subset of SEUs 850 executes a pixel shader to produce processed fragment data, which is then blended with other processed fragment data and written to the frame buffer in memory 804. The geometry shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 800 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 800 is embodied on a single semiconductor substrate. In another embodiment, the PPU 800 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 800 may be included on a graphics card that includes one or more memory devices 804 such as GDDR5 SDRAM. The graphics card may be configured to interface with a PCIe slot on a motherboard of a desktop computer that includes, e.g., a northbridge chipset and a southbridge chipset. In yet another embodiment, the PPU 800 may be an integrated graphics processing unit (iGPU) included in the chipset (i.e., Northbridge) of the motherboard.

Figure 9:
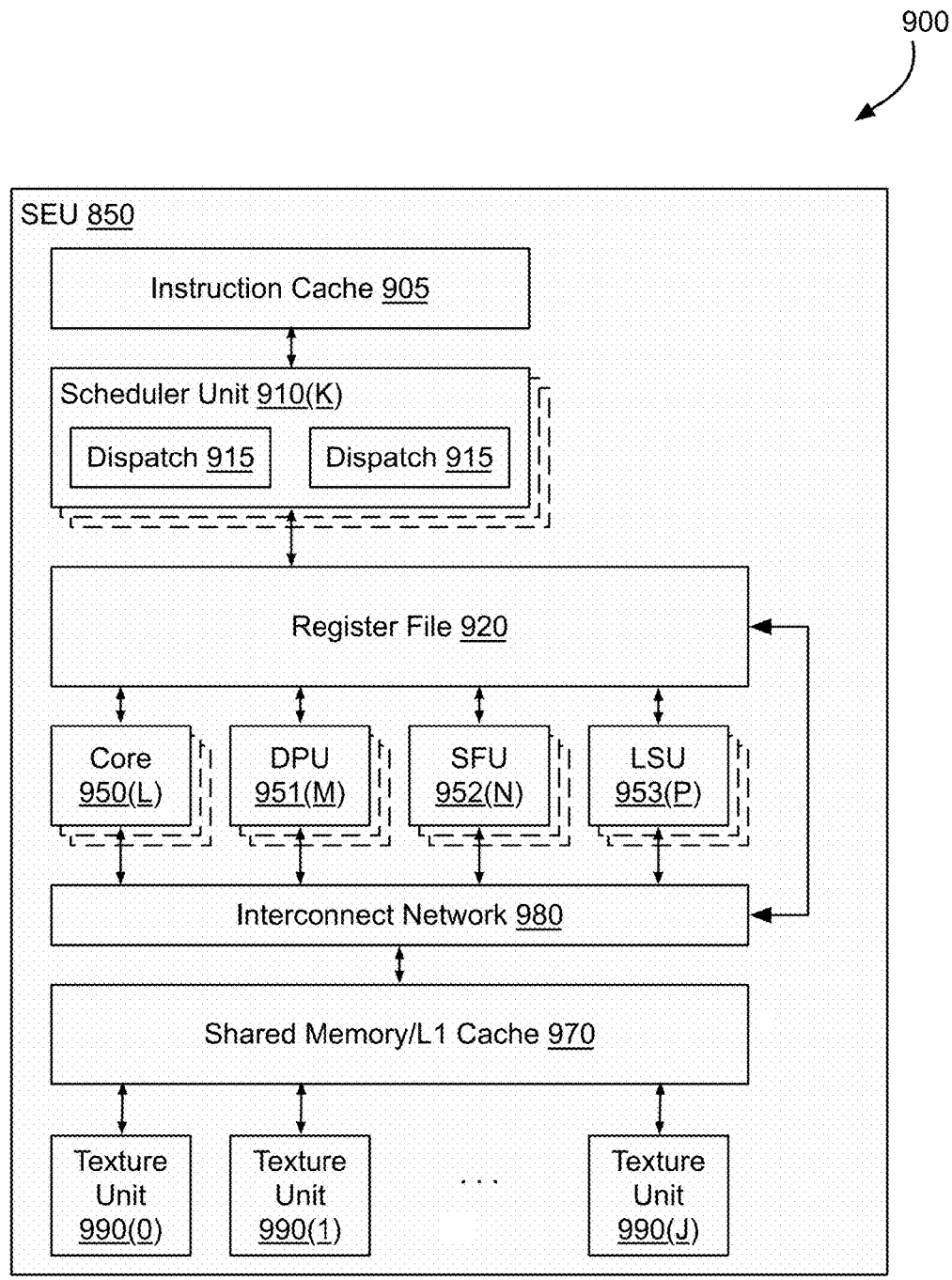
FIG. 9 illustrates the shader execution unit of FIG. 8, in accordance with one embodiment.

FIG. 9 illustrates the SEU 850 of FIG. 8, in accordance with one embodiment. As shown in FIG. 9, the SEU 850 includes an instruction cache 905, one or more scheduler units 910, a register file 920, one or more processing cores 950, zero or more double precision units (DPUs) 951, one or more special function units (SFUs) 952, one or more load/store units (LSUs) 953, an interconnect network 980, a shared memory/L1 cache 970, and one or more texture units 990.

Each SEU 850 includes a register file 920 that provides a set of registers for the functional units of the SEU 850. In one embodiment, the register file 920 is divided between each of the functional units such that each functional unit is allocated a dedicated portion of the register file 920. In another embodiment, the register file 920 is divided between the different warps being executed by the SEU 850. The register file 920 provides temporary storage for operands connected to the data paths of the functional units.

Each SEU 850 comprises L processing cores 950. In one embodiment, the SEU 850 includes a large number (e.g., 128, etc.) of distinct processing cores 950. Each core 950 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SEU 850 also comprises MDPUs 951 that implement double-precision floating point arithmetic, N SFUs 952 that perform special functions (e.g., copy rectangle, pixel blending operations, and the like), and P LSUs 953 that implement load and store operations between the shared memory/L1 cache 970 and the register file 920. In one embodiment, the SEU 850 includes 4 DPUs 951, 32 SFUs 952, and 32 LSUs 953.

Each SEU 850 includes an interconnect network 980 that connects each of the functional units to the register file 920 and the shared memory/L1 cache 970. In one embodiment, the interconnect network 980 is a crossbar that can be configured to connect any of the functional units to any of the registers in the register file 920 or the memory locations in shared memory/L1 cache 970.

In one embodiment, the SEU 850 is implemented within a GPU. In such an embodiment, the SEU 850 comprises J texture units 990. The texture units 990 are configured to load texture maps (i.e., a 2D array of texels) from the memory 804 and sample the texture maps to produce sampled texture values for use in shader programs. The texture units 990 implement texture operations such as anti-aliasing operations using mip-maps (i.e., texture maps of varying levels of detail). In one embodiment, the SEU 850 includes 8 texture units 990.

The PPU 800 described above may be configured to perform highly parallel computations much faster than conventional CPUs. Parallel computing has advantages in graphics processing, data compression, biometrics, stream processing algorithms, and the like.

Figure 10:
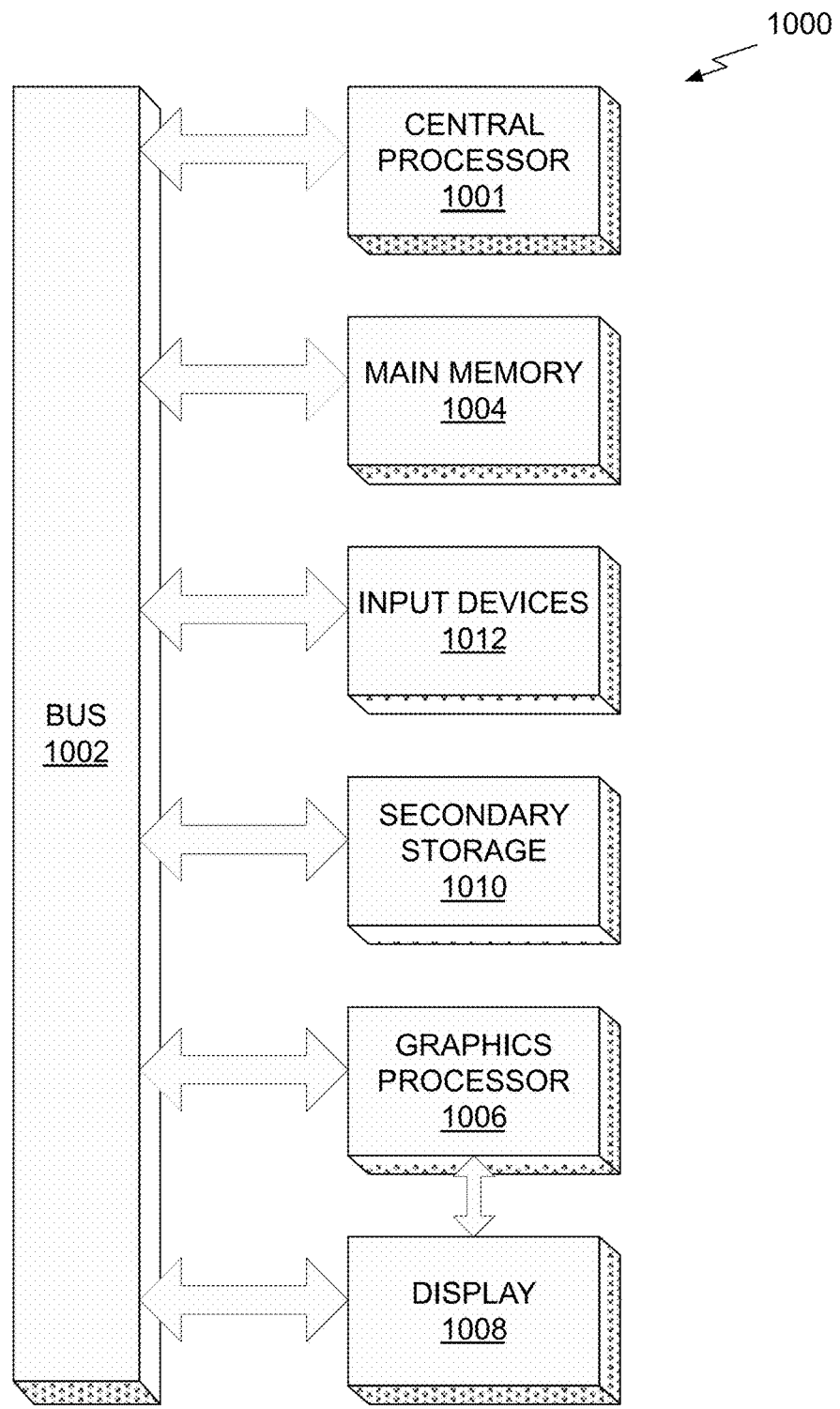
FIG. 10 illustrates an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one central processor 1001 that is connected to a communication bus 1002. The communication bus 1002 may be implemented using any suitable protocol, such as PCI (Peripheral Component Interconnect), PCI-Express, AGP (Accelerated Graphics Port), HyperTransport, or any other bus or point-to-point communication protocol(s). The system 1000 also includes a main memory 1004. Control logic (software) and data are stored in the main memory 1004 which may take the form of random access memory (RAM).

The system 1000 also includes input devices 1012, a graphics processor 1006, and a display 1008, i.e. a conventional CRT (cathode ray tube), LCD (liquid crystal display), LED (light emitting diode), plasma display or the like. In one embodiment, a distortion function is defined for the display 1008. User input may be received from the input devices 1012, e.g., keyboard, mouse, touchpad, microphone, and the like. In one embodiment, the graphics processor 1006 may include a plurality of shader execution units, a rasterization unit, etc. Each of the foregoing units may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 1004 and/or the secondary storage 1010. Such computer programs, when executed, enable the system 1000 to perform various functions. The main memory 1004, the storage 1010, and/or any other storage are possible examples of computer-readable media.

In one embodiment, the architecture and/or functionality of the various previous figures may be implemented in the context of the central processor 1001, the graphics processor 1006, an integrated circuit (not shown) that is capable of at least a portion of the capabilities of both the central processor 1001 and the graphics processor 1006, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, laptop computer, server, workstation, game consoles, embedded system, and/or any other type of logic. Still yet, the system 1000 may take the form of various other devices including, but not limited to a personal digital assistant (PDA) device, a mobile phone device, a television, etc.

Further, while not shown, the system 1000 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, from a shader execution unit, vertex coordinates for three-dimensional (3D) primitive in homogeneous coordinate space, wherein a first vertex coordinate represents a distance from a viewer to the 3D primitive;
computing a projective distortion factor based on a minimum determinant of a first derivative of a second vertex coordinate in screen-space;
performing, by circuitry, a projective geometric distortion operation on the first vertex coordinate using the projective distortion factor to produce a modified first coordinate;
dividing each one of the vertex coordinates by the modified first coordinate to produce perspective corrected vertex coordinates;
transforming the perspective corrected vertex coordinates from homogeneous coordinate space into the screen-space to produce screen-space vertex coordinates of a transformed 3D primitive; and
rasterizing the transformed 3D primitive in the screen-space using the screen-space vertex coordinates to produce an image for display.

2. The method of claim 1, wherein the projective geometric distortion operation approximates a reverse distortion that is used to reverse an optical distortion of a lens.

3. The method of claim 1, wherein the projective geometric distortion operation is configured to reduce a pixel sampling rate as a distance from a center of a display screen increases.

4. The method of claim 1, wherein the projective geometric distortion operation is configured to reduce a pixel sampling rate as a distance from a viewer increases.

5. The method of claim 1, wherein the projective geometric distortion corresponds to an upper left quadrant of the display screen and, further comprising, performing a second projective geometric distortion that corresponds to an upper right quadrant of the display screen.

6. The method of claim 5, wherein a third projective geometric distortion corresponds to a center region of the display screen, and further comprising performing the third projective geometric distortion on the first vertex coordinate defining primitives intersecting the center region.

7. The method of claim 5, wherein the first projective geometric distortion is associated with a first view and the second projective geometric distortion is associated with a second view.

8. The method of claim 1, further comprising computing the projective distortion factor that minimizes a number of shaded pixels.

9. The method of claim 1, further comprising, after transforming the perspective corrected vertex coordinates and before dividing each one of the vertex coordinates by the modified first coordinate, clipping the transformed 3D primitive.

10. The method of claim 1, wherein the perspective corrected vertex coordinates are transformed according to a view definition.

11. A system, comprising:
a graphics processor comprising:
a shader execution unit configured to output vertex coordinates for a three-dimensional (3D) primitive in homogeneous coordinate space, wherein a first vertex coordinate represents a distance from a viewer to the 3D primitive; and
a vertex coordinate modification unit configured to:
compute a projective distortion factor based on a minimum determinant of a first derivative of a second vertex coordinate in screen-space; and
perform a projective geometric distortion operation on the first vertex coordinate using the projective distortion factor to produce a modified first coordinate;
a perspective divide unit configured to divide each one of the vertex coordinates by the modified first coordinate to produce perspective corrected vertex coordinates;
a viewport transform unit configured to transform the perspective corrected vertex coordinates into the screen-space to produce screen-space vertex coordinates of a transformed 3D primitive;
a raster unit configured to rasterize the transformed 3D primitive in the screen-space using the screen-space vertex coordinates to produce an image for display; and
a display screen configured to display the image.

12. The system of claim 11, wherein the projective geometric distortion operation approximates a reverse distortion that is used to reverse an optical distortion of a lens.

13. The system of claim 11, wherein the projective geometric distortion operation is configured to reduce a pixel sampling rate as a distance from a center of a display screen increases.

14. The system of claim 11, wherein the projective geometric distortion operation is configured to reduce a pixel sampling rate as a distance from a viewer increases.

15. The system of claim 11, wherein the projective geometric distortion corresponds to an upper left quadrant of the display screen and, further comprising, performing a second projective geometric distortion that corresponds to an upper right quadrant of the display screen.

16. The system of claim 15, wherein a third projective geometric distortion corresponds to a center region of the display screen, and further comprising performing the third projective geometric distortion on the first vertex coordinate defining primitives intersecting the center region.

17. The method of claim 15, wherein the first projective geometric distortion is associated with a first view and the second projective geometric distortion is associated with a second view.

18. The method of claim 11, further comprising computing the projective distortion factor that minimizes a number of shaded pixels.

19. The system of claim 11, further comprising a clip unit that is coupled between the vertex coordinate modification unit and the perspective divide unit and configured to clip the transformed 3D primitive.

20. The system of claim 11, wherein the perspective corrected vertex coordinates are transformed according to a view definition.

* * * * *